US012627431B2

(12) United States Patent
Su et al.

(10) Patent No.: US 12,627,431 B2
(45) Date of Patent: May 12, 2026

(54) METHOD FOR DETERMINING SENDING POSITION, COMMUNICATIONS DEVICE AND STORAGE MEDIUM

(71) Applicant: DATANG MOBILE COMMUNICATIONS EQUIPMENT CO., LTD., Beijing (CN)

(72) Inventors: Yuwan Su, Beijing (CN); Jiaqing Wang, Beijing (CN); Meiying Yang, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 341 days.

(21) Appl. No.: 18/261,636

(22) PCT Filed: Jan. 10, 2022

(86) PCT No.: PCT/CN2022/070939
§ 371 (c)(1),
(2) Date: Jul. 14, 2023

(87) PCT Pub. No.: WO2022/152067
PCT Pub. Date: Jul. 21, 2022

(65) Prior Publication Data
US 2024/0097846 A1      Mar. 21, 2024

(30) Foreign Application Priority Data

Jan. 15, 2021    (CN) ......................... 202110055823.4

(51) Int. Cl.
*H04L 5/00*       (2006.01)
*H04W 68/00*       (2009.01)

(52) U.S. Cl.
CPC ......... *H04L 5/0048* (2013.01); *H04W 68/005* (2013.01)

(58) Field of Classification Search
CPC .............. H04L 5/0048; H04W 68/005; H04W 52/0216; H04W 52/0229; H04W 52/028; H04W 68/025
See application file for complete search history.

(56) References Cited

U.S. PATENT DOCUMENTS

2015/0264669 A1    9/2015  Kim et al.
2020/0022105 A1    1/2020  Fu et al.
(Continued)

FOREIGN PATENT DOCUMENTS

CN      108811083 A      11/2018
CN      109120566 A      1/2019
(Continued)

OTHER PUBLICATIONS

Partial Supplementary European Search Report for European Patent Application No. 22738948.3 issued by the European Patent Office on May 24, 2024.
(Continued)

*Primary Examiner* — Christine Ng
(74) *Attorney, Agent, or Firm* — Ladas & Parry, LLP

(57) ABSTRACT

A method for determining a sending position, a communications device and a storage medium are provided. The method includes: determining a first parameter by a communication device; determining, by the communication device, a sending position of a first signal according to the first parameter, where the first signal includes at least one of: a TRS, a CSI-RS, and a PEI; the first parameter includes at least one of: a paging-related parameter; a quantity of beams of the first signal.

18 Claims, 6 Drawing Sheets determining a first parameter by a communication device ⟋— 201 determining, by the communication device, a sending position of a first signal according to the first parameter ⟋— 202

(56) References Cited

U.S. PATENT DOCUMENTS

| | | | |
|---|---|---|---|
| 2020/0059891 A1 | 2/2020 | Huang et al. | |
| 2021/0067291 A1 | 3/2021 | Gao et al. | |
| 2021/0153162 A1 | 5/2021 | Chen | |
| 2021/0250899 A1* | 8/2021 | Liu | H04W 16/14 |
| 2022/0070783 A1 | 3/2022 | Hsieh et al. | |
| 2023/0108646 A1* | 4/2023 | Tseng | H04W 68/025 |
| | | | 455/458 |
| 2023/0144750 A1* | 5/2023 | Agiwal | H04W 48/14 |
| | | | 455/422.1 |
| 2023/0199714 A1* | 6/2023 | Li | H04W 68/02 |
| | | | 455/458 |
| 2023/0261829 A1 | 8/2023 | Liu | |
| 2023/0309060 A1* | 9/2023 | Xu | H04W 52/0216 |
| 2023/0328690 A1* | 10/2023 | Xu | H04W 72/232 |
| | | | 370/329 |
| 2023/0362889 A1* | 11/2023 | Xu | H04W 52/0219 |

FOREIGN PATENT DOCUMENTS

| | | | |
|---|---|---|---|
| CN | 110226351 A | 9/2019 | |
| CN | 110831125 A | 2/2020 | |
| CN | 111903085 A | 11/2020 | |
| CN | 111937450 A | 11/2020 | |
| CN | 112136349 A | 12/2020 | |
| EP | 4236533 A1 | 8/2023 | |
| WO | 2021180206 A1 | 9/2021 | |

OTHER PUBLICATIONS

"Paging Enhancements for UE Power Saving in NR," 3GPP TSG-RAN WG2 Meeting #111 electronic, R2-2008361, Online, Aug. 17-28, 2020, Agenda Item: 8.9.2, Source: MediaTek inc..

International Search Report for PCT Application No. PCT/CN2022/070939 issued on Mar. 30, 2022 and its English Translation provided by WIPO.

Written Opinion for PCT Application No. PCT/CN2022/070939 issued on Mar. 30, 2022 and its English Translation provided by WIPO.

International Preliminary Report on Patentability for PCT Application No. PCT/CN2022/070939 issued on Jul. 4, 2023 and its English Translation provided by WIPO.

"Discussion on TRS/CSI-RS occasion(s) for idle/inactive-mode UEs," R1-2008022, 3GPP TSG RAN WG1 #103-e, e-Meeting, Oct. 26-Nov. 13, 2020, Source: CMCC, Agenda item: 8.7.1.2.

Second Chinese Office Action and search report for the corresponding Chinese Patent Application No. 202110055823.4 issued on Dec. 27, 2023.

"Discussion on paging enhancements," 3GPP TSG RAN WG1 #103-e R1-2009187, e-Meeting, Oct. 26-Nov. 13, 2020, Source: NTT Docomo, Inc., Title: Discussion on paging enhancements.

* cited by examiner network device

11 terminal

| determining a first parameter by a communication device | 201 |
| --- | --- |

| determining, by the communication device, a sending position of a first signal according to the first parameter | 202 |

N*Ns* quantity of beams is greater than or equal to threshold

N*Ns* quantity of beams is less than threshold second parameter=SFN_PF mod X

SFN_PF*Ns+i_s second parameter

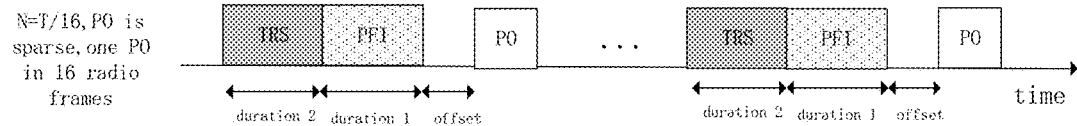
Fig. 12
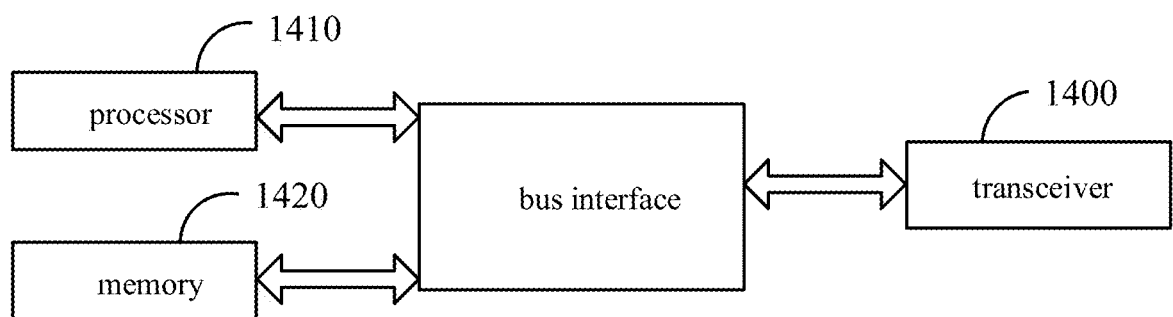
determining, by a communication device, a sending position of a third signal according to a sending position of a second signal ——1301
Fig. 13
Fig. 14
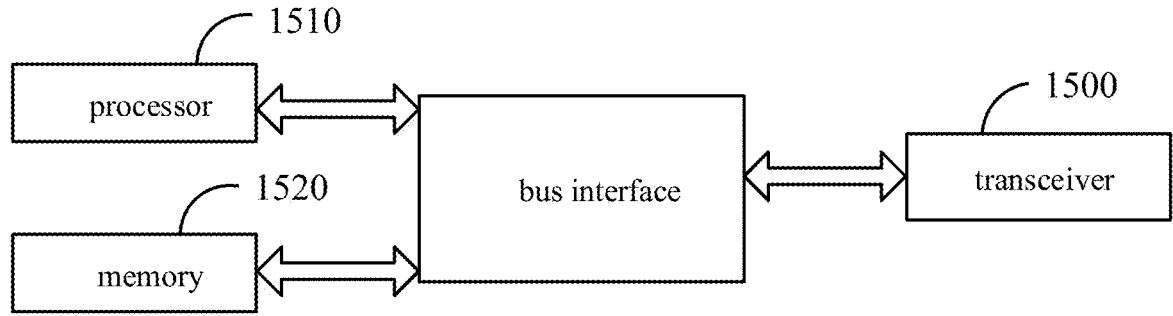
Fig. 15

1600 first determining unit — 1601 second determining unit — 1602 communication device

1700 determining unit — 1701 communication device

1

METHOD FOR DETERMINING SENDING POSITION, COMMUNICATIONS DEVICE AND STORAGE MEDIUM

CROSS-REFERENCE TO RELATED APPLICATIONS

The present disclosure is the U.S. national phase of PCT Application PCT/CN2022/070939 filed on Jan. 10, 2022, which claims a priority of to Chinese patent disclosure No. 202110055823.4 filed on Jan. 15, 2021, the disclosures of which is are incorporated herein by reference in their entireties.

TECHNICAL FIELD

The present disclosure relates to the technical field of communication, and in particular, to a method for determining a sending position, a communications device and a storage medium.

BACKGROUND

In some communication systems, the power-saving design of the terminal becomes very necessary. At this stage, the node scheme design is mainly aimed at the Idle mode or the Inactive mode. In order to help the UE in Idle/Inactive mode to know the indication of the paging message and channel time-frequency tracking in advance, a first signal will be sent prior to the paging occasion (PO), where the first signal may include a tracking reference signal (Tracking Reference Signal, TRS), a channel state information reference signal (Channel-State-Information Reference Signal, CSI-RS), paging early indication (Paging Early Indication, PEI).

SUMMARY

Embodiments of the present disclosure provide a method for determining a sending position, a communication device, and a storage medium.

A method for determining a sending position is provided in an embodiment of the present disclosure, including:
determining a first parameter by a communication device;
determining, by the communication device, a sending position of a first signal according to the first parameter, where the first signal includes at least one of:
a tracking reference signal (TRS), a channel state information reference signal (CSI-RS), and a paging early indication (PEI);
the first parameter includes at least one of:
a paging-related parameter;
a quantity of beams of the first signal.
Optionally, the paging-related parameter includes at least one of:
N, Ns, T, a target physical downlink control channel (PDCCH) monitoring occasion, X;
where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.
Optionally, the determining by the communication device the sending position of the first signal according to the first parameter includes:

determining, by the communication device, the sending position of the first signal corresponding to the X PO/PF according to the first parameter.
Optionally, the X is configured by a network device; or
when the paging-related parameter does not include the X, the X is determined according to the paging-related parameter; or
when the paging-related parameter does not include the X, the X is determined according to the quantity of beams of the first signal; or
when the paging-related parameter does not include the X, the X is determined according to the paging-related parameter and the quantity of beams of the first signal.
Optionally, the X is configured by the network device, including:
the X is configured by the network device through a system message.
Optionally, the X is determined according to the N, and the N and the X have a first corresponding relationship; or
the X is determined according to the Ns, and the Ns and the X have a second corresponding relationship; or
the X is determined according to the N and the Ns, and the X, the N and the Ns have a third corresponding relationship; or
the X is determined according to the N, the Ns and the quantity of beams of the first signal, and the X, the N, the Ns and the quantity of beams of the first signal have a fourth corresponding relationship.
Optionally, the value of X is 1, or 2, or 4, or 8.
Optionally, a maximum quantity of PF corresponding to X PO is 2, and a maximum quantity of PF corresponding to one PEI is 2.
Optionally, when the first signal includes at least two of TRS, CSI-RS and PEI, and the X has multiple candidate values, the determining the sending position of the first signal corresponding to the X PO/PF include at least two of:
determining the sending position of the TRS corresponding to X1 PO/PF; or
determining the sending position of the PEI corresponding to X2 PO/PF; or
determining the sending position of the CSI-RS corresponding to X3 PO/PF;
where the X1, X2, and X3 are values among the plurality of candidate values.
Optionally, at least two of the X1, X2 and X3 have a fifth corresponding relationship with the N; or
at least two of the X1, X2 and X3 have a sixth corresponding relationship with the Ns; or
at least two of the X1, X2 and X3 have a seventh corresponding relationship with the N and the Ns; or
at least two of the X1, X2 and X3 have an eighth corresponding relationship with the N, the Ns and the quantity of beams of the first signal.
Optionally, the determining the sending position of the first signal corresponding to the X PO/PF includes:
determining a target PO/PF in the X PO/PF, and determining the sending position of the first signal corresponding to the X PO/PF based on the target PO/PF;
where the target PO/PF is determined by a second parameter of each PO/PF in the X PO/PF.
Optionally, the second parameter of the PO is associated with at least one of:
a system frame number of the PF where the PO is located, the Ns, the i_s corresponding to the PO, and the X, where the i_s represents an index of the PO; and/or
the second parameter of the PF is associated with at least one of:

the system frame number of the PF, the X.

Optionally, the determining by the communication device the sending position of the first signal according to the first parameter includes:

determining, by the communication device, a sending cycle of the first signal according to the first parameter, and determining the sending position of the first signal according to the sending cycle.

Optionally, when the sending cycle of the first signal is less than or equal to a first threshold, the sending position of the first signal is determined according to the sending position of the first PO of the PF and a first offset; or when the sending cycle of the first signal is greater than the first threshold, the sending position of the first signal is determined according to the sending position of the first PO of the PF, a first offset, $i\_s$ and the sending cycle, the $i\_s$ represents an index of the PO in the PF;

where the first offset is a time-domain interval between the sending position of the first signal and the sending position of the first PO of the PF.

Optionally, the sending cycle of the first signal has a ninth corresponding relationship with at least one of:

the N, the Ns, and the quantity of beams of the first signal.

Optionally, when the first signal includes at least two of TRS, CSI-RS and PEI, the determining the sending position of the first signal includes:

determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

Optionally, the sending position of the TRS is contiguous in time domain with the sending position of the PEI; or the sending position of the TRS and the sending position of the PEI are at a fixed preset interval in time domain; or an offset between the sending position of the TRS and the sending position of the PEI is an offset of the PEI relative to the PO; or the sending position of the CSI-RS is continuous in time domain with the sending position of the PEI; or the sending position of the CSI-RS and the sending position of the PEI are at a fixed preset interval in time domain; or an offset between the sending position of the CSI-RS and the sending position of the PEI is an offset of the PEI relative to the PO.

Optionally, the PEI is a target PEI of a plurality of PEIs.

Optionally, the method further includes:

when the communication device is a terminal, the terminal receiving the first signal at the sending position of the first signal; or when the communication device is a network device, the network device sending the first signal at the sending position of the first signal.

A method for determining a sending position is provided in an embodiment of the present disclosure, including:

determining, by a communication device, a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

Optionally, the sending position of the second signal is determined according to a first parameter, and the first parameter includes at least one of:

a paging-related parameter;

a quantity of beams of the second signal.

A communications device is provided in an embodiment of the present disclosure, including: a memory, a transceiver, and a processor, where the memory is configured to store computer programs; the transceiver is configured to send and receive data under a control of the processor; the processor is configured to read the computer programs in the memory to perform:

determining a first parameter;

determining a sending position of a first signal according to the first parameter, where the first signal includes at least one of:

a tracking reference signal (TRS), a channel state information reference signal (CSI-RS), and a paging early indication (PEI);

the first parameter includes at least one of:

a paging-related parameter;

a quantity of beams of the first signal.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the determining by the communication device the sending position of the first signal according to the first parameter includes:

determining, by the communication device, the sending position of the first signal corresponding to the X PO/PF according to the first parameter.

Optionally, the determining the sending position of the first signal corresponding to the X PO/PF includes:

determining a target PO/PF in the X PO/PF, and determining the sending position of the first signal corresponding to the X PO/PF based on the target PO/PF;

where the target PO/PF is determined by a second parameter of each PO/PF in the X PO/PF.

Optionally, the determining by the communication device the sending position of the first signal according to the first parameter includes:

determining, by the communication device, a sending cycle of the first signal according to the first parameter, and determining the sending position of the first signal according to the sending cycle.

Optionally, the first signal includes at least two of TRS, CSI-RS and PEI, the determining the sending position of the first signal includes:

determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

A communications device is provided in an embodiment of the present disclosure, including: a memory, a transceiver, and a processor, where the memory is configured to store computer programs; the transceiver is configured to send and receive data under a control of the processor; the processor is configured to read the computer programs in the memory to perform:

determining a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

Optionally, the sending position of the second signal is determined according to a first parameter, and the first parameter includes at least one of:

a paging-related parameter;

a quantity of beams of the second signal.

A communication device is provided in an embodiment of the present disclosure, including:

a first determining unit, configured to determine a first parameter;

a second determining unit, configured to determine a sending position of a first signal according to the first parameter, where the first signal includes at least one of:

a tracking reference signal (TRS), a channel state information reference signal (CSI-RS), and a paging early indication (PEI);

the first parameter includes at least one of:

a paging-related parameter;

a quantity of beams of the first signal.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the X is configured by a network device through a system message.

Optionally, the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

Optionally, the value of X is 1, or 2, or 4, or 8.

Optionally, a maximum quantity of PF corresponding to X PO is 2, and a maximum quantity of PF corresponding to one PEI is 2.

Optionally, the determining by the communication device the sending position of the first signal according to the first parameter includes:

determining, by the communication device, the sending position of the first signal corresponding to the X PO/PF according to the first parameter A communication device is provided in an embodiment of the present disclosure, including:

a determining unit, configured to determine a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

Optionally, the sending position of the second signal is determined according to a first parameter, and the first parameter includes at least one of:

a paging-related parameter;

a quantity of beams of the second signal.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the X is configured by a network device through a system message.

Optionally, the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

Optionally, the value of X is 1, or 2, or 4, or 8.

Optionally, a maximum quantity of PF corresponding to X PO is 2, and a maximum quantity of PF corresponding to one PEI is 2.

A processor-readable storage medium is provided in an embodiment of the present disclosure, where the processor-readable storage medium stores a computer program, the computer program is configured to enable the processor to perform the method for determining a sending position in the embodiments of the present disclosure.

According to the embodiment of the present disclosure, a communication device determines a first parameter; the communication device determines a sending position of a first signal according to the first parameter, where the first signal includes at least one of: a tracking reference signal (TRS), a channel state information reference signal (CSI-RS), and a paging early indication (PEI); the first parameter includes at least one of: a paging-related parameter; a quantity of beams of the first signal.

The technical solution of the embodiments of the present disclosure may save the power consumption of the communication device, and can also reduce a resource overhead.

BRIEF DESCRIPTION OF THE DRAWINGS

FIGS. 3 to 12 are schematic diagrams of the sending position of the first signal in an embodiment of the present disclosure;

FIG. 13 is another flow chart of a method for determining a sending position in an embodiment of the present disclosure;

FIG. 14 is a structural diagram of a communication device in an embodiment of the present disclosure;

FIG. 15 is a structural diagram of another communication device in an embodiment of the present disclosure;

DETAILED DESCRIPTION

In order to make the technical problems, technical solutions and advantages to be solved by the present disclosure clearer, the following will describe in detail with reference to the drawings and specific embodiments.

The term "and/or" in the embodiments of the present disclosure describes the association relationship of associated objects, indicating that there may be three relationships, for example, A and/or B, which may mean: A exists alone, A and B exist simultaneously, and B exists alonese three situations. The character "/" generally indicates that the contextual objects are an "or" relationship.

The term "multiple" in the present disclosure refers to two or more, and other quantifiers are similar.

The following will clearly and completely describe the technical solutions in the embodiments of the present disclosure with reference to the accompanying drawings in the embodiments of the present disclosure. Obviously, the described embodiments are only some of the embodiments of the present disclosure, not all of them. Based on the embodiments in the present disclosure, all other embodiments obtained by persons of ordinary skill in the art without making creative efforts belong to the protection scope of the present disclosure.

Embodiments of the present disclosure provide a method for determining a sending position, a communication device, and a storage medium, so as to solve the problem of large resource overhead.

Among them, the method and the device are conceived based on the same application. Since the method and the device have similar problem-solving principles, the implementation of the device and the method can be referred to each other, and the repetition will not be repeated.

The embodiment of the present disclosure may be applicable to various systems, especially 6G systems. For example, the applicable system may be global system of mobile communication (GSM) system, code division multiple access (code division multiple access, CDMA) system, wideband code division multiple access (Wideband Code Division Multiple Access, WCDMA) general packet radio service (general packet radio service, GPRS) system, long term evolution (long term evolution, LTE) system, LTE frequency division duplex (frequency division duplex, FDD) system, LTE time division duplex (time division duplex, TDD) system, Long term evolution advanced (LTE-A) system, universal mobile telecommunications system (UMTS), worldwide interoperability for microwave access (WiMAX) system, 5G new air interface (New Radio, NR) system, 6G system, etc. These various systems include end devices and network devices. The system may also include a core network part, such as an evolved packet system (Evolved Packet System, EPS), a 5G system (5GS), and the like.

Figure 1:
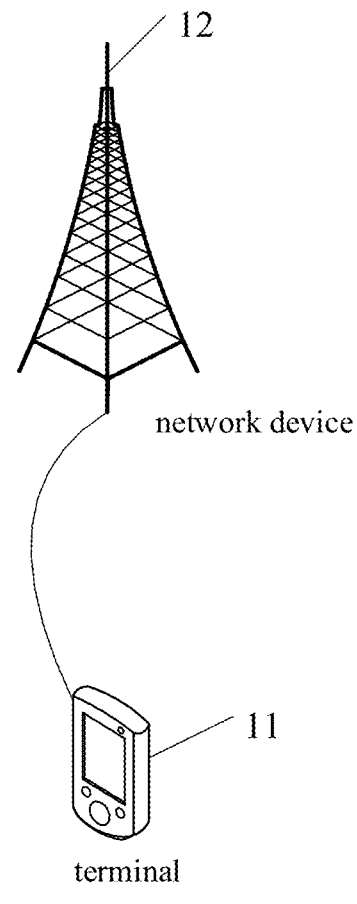
FIG. 1 is a schematic structural diagram of an applicable network architecture in the present disclosure.

Please refer to which is a schematic structural diagram of a network architecture applicable to the implementation of the present disclosure. As shown in FIG. 1, it includes a terminal 11 and a network device 12.

the terminal involved in the embodiments of the present disclosure may be a device that provides voice and/or data connectivity to users, a handheld device with a wireless connection function, or other processing devices connected to a wireless modem. In different systems, the name of the terminal equipment may be different. For example, in a 5G system, the terminal equipment may be called user equipment (User Equipment, UE). Wireless terminal equipment can communicate with one or more core networks (Core Network, CN) via a radio access network (Radio Access Network, RAN). The wireless terminal equipment can be a mobile terminal equipment, such as a mobile phone (or called a "cellular" telephones) and computers with mobile terminal equipment, such as portable, pocket, hand-held, computer built-in or vehicle-mounted mobile devices, which exchange language and/or data with the radio access network. For example, Personal Communication Service (PCS) phones, cordless phones, Session Initiated Protocol (SIP) phones, Wireless Local Loop (WLL) stations, Personal Digital Assistant, PDA), Redcap terminal and other devices. Wireless terminal equipment can also be called system, subscriber unit, subscriber station, mobile station, mobile station, remote station, access point, a remote terminal (remote terminal), an access terminal (access terminal), a user terminal (user terminal), a user agent (user agent), and a user device (user device), which are not limited in the embodiments of the present disclosure.

The network device in the present disclosure may be a base station, and the base station may include multiple cells that provide services for terminals. Depending on the specific application, the base station can also be called an access point, or it can be a device in the access network that communicates with the wireless terminal device through one or more sectors on the air interface, or other names. Network devices can be configured to interchange received over-the-air frames with Internet Protocol (IP) packets and act as routers between wireless end devices and the rest of the access network, which can include the Internet Protocol (IP) communication network. Network devices may also coordinate attribute management for the air interface. For example, the network device involved in this embodiment of the present disclosure may be a network device (Base Transceiver Station, BTS) in Global System for Mobile communications (GSM) or Code Division Multiple Access (CDMA).), or a network device (NodeB) in Wide-band Code Division Multiple Access (WCDMA), or an evolved network device in a long term evolution (LTE) system (evolutional Node B, eNB or e-NodeB), 5G base station (gNB) in the 5G network architecture (next generation system), base station in 6G, or Home evolved Node B (HeNB), relay A node (relay node), a home base station (femto), a pico base station (pico), etc. are not limited in this embodiment of the present disclosure. In some network structures, a network device may include a centralized unit (centralized unit, CU) node and a distributed unit (distributed unit, DU) node, and the centralized unit and the distributed unit may also be arranged geographically separately.

One or more antennas can be used between network devices and terminals for Multi Input Multi Output (MIMO) transmission. MIMO transmission can be Single User MIMO (Single User MIMO, SU-MIMO) or Multi-User MIMO (Multiple User MIMO, MU-MIMO). According to the shape and number of root antenna combinations, MIMO transmission can be 2D-MIMO, 3D-MIMO, FD-MIMO, or massive-MIMO, or diversity transmission, precoding transmission, or beamforming transmission, etc.

Figure 2:
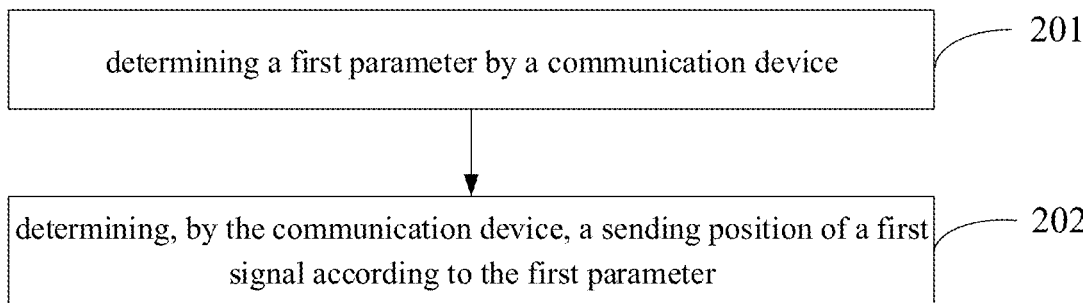
FIG. 2 is a flow chart of a method for determining a sending position in an embodiment of the present disclosure.

FIG. 2 is a flowchart of a method for determining a sending position in an embodiment of the present disclosure. As shown in FIG. 2, the method includes the following steps:

Step 201: determining a first parameter by a communication device;

Step 202: determining, by the communication device, a sending position of a first signal according to the first parameter, where the first signal includes at least one of:

a tracking reference signal (TRS), a channel state information reference signal (CSI-RS), and a paging early indication (PEI);

the first parameter includes at least one of:

a paging-related parameter;

a quantity of beams of the first signal.

The foregoing communication device may be a terminal or a network device.

The above determining the first parameter may be selecting a first parameter from the obtained parameters. In addition, the above first parameter may be configured by system information (System Information, SI), such as configured by system information block (System Information Block, SIB) 1 signaling, or, the above first parameter may be pre-configured, or, the above first parameter may be agreed upon by the protocol, or obtained in other ways that can be obtained in a non-connected state (such as an idle state or an inactive state).

The above paging-related parameter may be parameters related to terminal paging monitoring, for example: the above paging-related parameter may include at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

In the embodiment of the present disclosure, the "I" means "or".

where the above target PDCCH monitoring occasion may also be expressed as firstPDCCH-MonaoringOccasion-OfPO.

The above X is the quantity of PO/PF corresponding to one of the first signals. It can be understood that X PO/PF correspond to one of the above first signals, for example: sending a first signal to the terminal for every X PO/PF network devices. It should be noted that, when the above first signals include multiple items of TRS, CSI-RS, and PEI, the above one first signal is multiple items of TRS, CSI-RS, and PEI, for example: a first signal Refers to a TRS and a CSI-RS, or a TRS and a PEI, or a CSI-RS and a PEI, etc.; when the above first signal includes one of TRS, CSI-RS, and PEI, the above one first signal is a TRS, a CSI-RS or a PEI. In the first scenario, the above X is an integer greater than 1, that is, multiple PO/PF corresponding to one of the first signals; in the second scenario, the above X can be equal to 1, that is, in the second scenario, one of the first signal corresponding to multiple PO/PF. The above first scenario may include a PO-dense scenario, so that in a PO-dense scenario, the resource overhead of the first signal of the network device can be reduced, and the possibility of collision between the first signal and the PO can be reduced, thereby reducing UE power consumption, The foregoing second scenario may include a scenario where PO are sparse. In addition, the above first scenario may also be that the above first parameter satisfies the first condition, for example: N*Ns* the quantity of beams of first signal is greater than or equal to the first threshold, or the ratio of N to T is greater than or equal to the second threshold, such as N=1, N/T=1/2, etc.; the above second scenario may also be that the above first parameter satisfies the second condition, for example: N*Ns*the quantity of beams of first signal is less than the first threshold, or, the ratio of N to T is smaller than the second threshold, such as N/T=1/4, N/T=1/8 and so on.

The foregoing quantity of beams of the first signal may be the quantity of beams used by the network device to send the first signal, and the number may be greater than or equal to 1. In addition, for different scenarios, the network device may use different numbers of beams to send the first signal. For example: the quantity of beams of the first signal can be stipulated in the protocol, or notified by the network, or bound to the quantity of beams of the SSB, that is, the quantity of beams of the first signal is the same as the quantity of beams of the SSB, or the quantity of beams of the first signal is the same as the quantity of beams of the paging control information (paging PDCCH) scheduling the paging message (paging PDSCH), or the quantity of beams of the first signal is the same as the quantity of beams of the paging message (paging PDSCH). The manner of acquiring or determining the quantity of beams of the first signal is not limited.

The above first signal may be the starting position of a first signal resource, or may be the end position of a first signal resource, or may be the starting position of a set of first signal resources, or may be is the end position of a first signal resource set, or may be the start position of a multi-beam first signal resource, and the multi-beam first signal resource includes multiple sending/detection/receiving positions of the first signal, or, may be an end position of a multi-beam first signal resource, where the multi-beam first signal resource includes multiple sending/detecting/receiving positions of the first signal.

In the embodiment of the present disclosure, the above steps can determine the sending position of the first signal according to the above first parameter, which can save the power consumption of the communication device, because there is no need to receive the RRC configuration information that configures the sending configuration of the above first signal.

In addition, in the embodiment of the present disclosure, compared with directly configuring a first signal before each PO in any scenario, for example, in the case of dense PO, there is a first signal before each PO. The embodiment of the present disclosure may also reduce resource overhead. For example, in a scenario where PO are dense, the resource overhead of the first signal of the network device can be reduced, and the possibility of collision between the first signal and PO can be reduced, thereby reducing power consumption of the UE.

In the embodiments of the present disclosure, in some implementations, the number and position of PO in the DRX cycle are determined by paging-related parameter, that is, the paging-related parameter can determine the density or sparseness of PO. In this way, when the sending position of the first signal is determined according to the first parameter, and the first parameter includes at least one of paging-related parameter and the quantity of beams of the first signal, then when the paging-related parameter determine that PO are dense, determining the sending strategy and sending position of the first signal according to the first parameter, so that resource overhead can be reduced because the sending position of the first signal is determined according to the first parameter.

In addition, in the embodiments of the present disclosure, the foregoing terminal may be a terminal in an RRC idle state (RRC Idle) or an inactive state (Inactive mode).

As an optional implementation manner, the communication device determining the sending position of the first signal according to the first parameter includes:

The communication device determines the sending position of the first signal corresponding to the X PO/PF according to the first parameter.

According to the first parameter, determining the sending positions of the first signals corresponding to the X PO/PF may be, when the first parameters include the above X, determining the first signal corresponding to the X PO/PF The sending position of a signal, or in the case that the first parameter does not include X, determining the above X according to the first parameter, so as to determine the sending positions of the first signal corresponding to the X PO/PF. The above—mentioned sending position of the first signal corresponding to the X PO/PF may be a sending position of one first signal corresponding to the X PO/PF. In addition, the foregoing X may be an integer greater than or equal to 1, and may be specifically configured according to actual conditions.

In this embodiment, since X PO/PF correspond to one of the above first signals, in the case of dense PO, the resource overhead of the network device for the first signal can be reduced, and the collision possibility between the first signal and the PO can also be reduced, so as to further reduce terminal power consumption.

For example, if the network device needs to send a PEI indicating whether the paging message exists or a TRS for channel tracking for a terminal in the RRC idle state/inactive state, the network device determines the sending position of the TRS/PEI according to the first parameter, such as The network device determines a sending position corresponding to one TRS/PEI for each X PO/PF.

It should be noted that the sending position of the first signal among the sending positions of the first signals corresponding to every X PO determined by the above network device may be the starting position of a first signal resource, or may be a first signal resource or, may be the starting position of a first signal resource set, or may be the ending position of a first signal resource set, or may be the starting position of a multi-beam first signal resource, the multi-beam first signal resource includes the sending/detection/receiving positions of multiple first signals, or it may be the end position of a multi-beam first signal resource, and the multi-beam first signal resource includes multiple first signals send/detect/receive position. The embodiment of the present disclosure does not limit the specific relationship between the sending position of the first signal and the first signal resource.

Optionally, the X is configured by a network device; or when the paging-related parameter does not include the X, the X is determined according to the paging-related parameter; or when the paging-related parameter does not include the X, the X is determined according to the quantity of beams of the first signal; or when the paging-related parameter does not include the X, the X is determined according to the paging-related parameter and the quantity of beams of the first signal.

The above X may be configured by the network device to the terminal, for example: configured to the terminal through an SI signaling, or pre-configured by the network device to the terminal.

For example: the network device is configured with X, where X may be configured for a system message or an RRC message, which is not limited in the present disclosure. Preferably, when configuring the parameter X, the network device may consider N and/or Ns and/or the quantity of beams of the first signal, for example, the larger value of N is, the larger the value of X will be.

The above X may be determined according to the above N and Ns according to the paging-related parameter, for example:

the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

where the above corresponding relationship may be pre-configured or stipulated in a protocol. In addition, the above corresponding relationship may be a relational table or a functional relationship.

For example: having the first corresponding relationship between the above N and the X may include the following situations:

The value range of network device configuration N can be {T, T/2, T/4, T/8, T/16}. Since N can be configured to describe the number of PF in the DRX cycle, the larger the value of N is, the more the number of PF will be, at this time, when designing the corresponding relationship between X and N, a better design method is that the larger the value of N is, the larger the value of X will be, for example: as shown in Table 1:

TABLE 1

| N | x |
|---|---|
| T | 4 |
| T/2 | 2 |
| T/4 | 1 |
| T/8 | 1 |
| T/16 | 1 |

In addition, another implementation is given below, that is, a specific example of the corresponding relationship between X and N is given by means of a predefined formula, for example, X and N satisfy the formula (1): $X=\max(A*N/(T/4), 1)$, A is the coefficient, here the better value of A is 1.

The network device can determine the value of X according to the corresponding relationship between X and N in Table 1 or formula (1) and the value of N. The following examples illustrate:

When N=T, it is indicated that each radio frame in the DRX cycle is a PF, and the PF is dense at this time. At this time, X=4, therefore, the network device determines that every 4 PF correspond to a sending position of the first signal.

Figure 3:
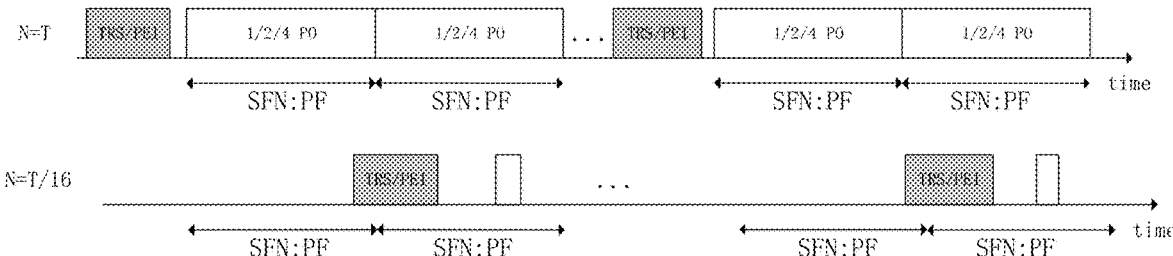

When N=T/16, it is indicated that one PF exists in every 16 radio frames in the DRX cycle, and the PF is sparse at this time. At this time, X=1. Therefore, the network device may each PF correspond to a sending position of the first signal, for example, as shown in FIG. 3.

In the embodiment of the present disclosure, X is the quantity of PO/PF corresponding to the first signal, including the following situations: the first signal can be PEI or TRS or CSI-RS, and the first signal is PEI as an example below describe. When the first signal is PEI, the resources of a first signal include 1 PEI, that is, 1 PEI corresponds to X PO or PF, and the terminals corresponding to X PO or PF all determine the paging status through this 1 PEI, as in Example given in FIG. 3 when N=T. Or, when the first signal is PEI, the resources of a first signal include Y PEI, that is, Y PEI correspond to X PO or PF. At this time, the value of Y and the value of X can be the same or different, and the UE corresponding to the X PO or PF determines the paging situation through Y PEI. For example, when Y=X, the UEs corresponding to different PO or PF determine the paging situation through different PEI. However, the Y PEI constitute a first signal, the resources of the first signal include the resources of the Y PEI, and the resources of the Y PEI may occupy different time-frequency resources in the first signal resources. At this time, from the perspective of resources, X also satisfies the following definition, and X is the quantity of PO/PF corresponding to one first signal.

For example: having the first corresponding relationship between the above Ns and the X may include the following situations:

Network equipment configures the paging parameter Ns, and the value range of Ns is {1, 2, 4}. Since the value of X is related to Ns, the corresponding relationship between X and Ns can be given in a predefined way, and then, according to the corresponding relationship between X and Ns and the value of Ns determine the value of X. Because Ns can be configured to describe the number of PO in each PF, the larger the value of Ns, the more PO in PF. At this time, when designing the correspondence between X and Ns, a better design method is, the larger the value of Ns is, the larger the value of X will be. For example: as shown in Table 2:

TABLE 2

| NS | x |
|---|---|
| 4 | 8 |
| 2 | 4 |
| 1 | 1 |

In addition, another implementation method is given below, that is, a specific example of the corresponding relationship between X and Ns is given by means of a predefined formula, such as X and Ns satisfy the formula (2): if Ns>1: $X=A*Ns$, others: $X=1$, A is the coefficient, here the better value of A is 2.

The network device can determine the value of X according to the corresponding relationship between X and Ns in Table 2 or formula (2) and the value of Ns. The following example illustrates: When Ns=4, indicating that each PF contains 4 PO, and the PO in the PF are dense at this time. At this time, X=8, therefore, the network device determines that every 8 PO correspond to a sending position of a TRS/PEI.

Figure 4:
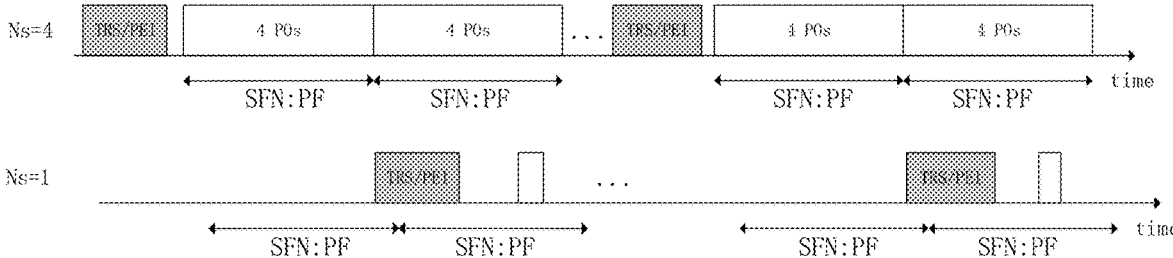

When Ns=1, it is indicated that each PF contains 1 PO, and the PO in the PF are sparse at this time. At this time, X=1, therefore, the network device determines the sending position of each PO corresponding to a TRS/PEI, for example, as shown in FIG. 4 below.

For example: the situation that X and the N and the Ns have a third corresponding relationship may include the following:

The network device configures paging parameters N and Ns, the value range of N is {T, T/2, T/4, T/8, T/16}, the value range of Ns is {1, 2, 4}, Since the value of X is related to N and Ns, the corresponding relationship between X, N and Ns can be given in a predefined way, and then, X can be determined according to the corresponding relationship between X, N and the values of N and Ns. Because N*Ns can be configured to describe the number of PO in the DRX cycle, the larger the value of N and Ns is, the more the number of PO will be. At this time, when designing the corresponding relationship between X and N and Ns, a better design method is that the larger the value of N and Ns is, the larger the value of X will be. For example: as shown in Table 3.

TABLE 3

| N | NS | x |
|---|---|---|
| T | 4 | 8 |
| T | 2 | 4 |
| T | 1 | 2 |
| T/2 | 4 | 4 |
| T/2 | 2 | 2 |
| T/2 | 1 | 1 |
| T/4 | 4 | 2 |
| T/4 | 2 | 1 |
| T/4 | 1 | 1 |
| T/8 | 4 | 1 |
| T/8 | 2 | 1 |
| T/8 | 1 | 1 |
| T/16 | 4 | 1 |
| T/16 | 2 | 1 |
| T/16 | 1 | 1 |

The network device can determine the value of X according to the corresponding relationship between X, N and Ns and the values of N and Ns in Table 3. The following examples illustrate:

When N=T, Ns=4, it means that each frame in the DRX cycle is a PF, and each PF contains 4 PO. At this time, the PO in the DRX cycle are dense; at this time, X=8, so the network equipment determines that every 8 PO correspond to a sending position of the first signal.

That is to say, one PF includes 4 PO, and one PEI corresponds to X=8 PO. Therefore, the maximum quantity of PF corresponding to X PO is 2, that is, the maximum quantity of PF corresponding to one PEI is 2.

Figure 5:
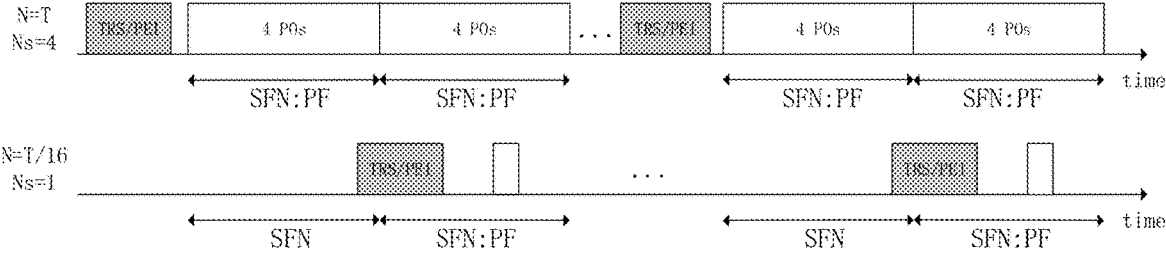

When N=T/16, Ns=1, it means that there is one PF in every 16 radio frames in the DRX cycle, and each PF contains one PO, and the PO in the DRX cycle are sparse at this time. At this time, X=1, therefore, the network device determines that each PO corresponds to a sending position of a first signal, for example, as shown in FIG. 5.

Further, in the embodiment of the present disclosure, the value of X is related to the beam quantity of the first signal, and the corresponding relationship between X and the beam quantity of the first signal can be given in a predefined manner, and further, according to X and the first signal The value of X is determined by the corresponding relationship of the beam quantity of the signal and the value of the beam quantity of the first signal. When designing the corresponding relationship between X and the beam quantity of the first signal, a better design method is that the larger the value of the beam quantity is, the larger the value of X will be, for example: as shown in Table 4:

TABLE 4

| quantity of beams | x |
|---|---|
| >=Threshold A | 8 |
| <Threshold A | 1 |

Further, in the embodiment of the present disclosure, the value of X is related to N and the beam quantity of the first signal, and the corresponding relationship between X and N and the beam quantity of the first signal can be given in a predefined manner, and then, the value of X can be determined based on the corresponding relationship between X and N and the beam quantity of the first signal, and the value of N and the value of the beam quantity of the first signal. When designing the corresponding relationship between X and N and the beam quantity of the first signal, a better design method is that the larger the values of N and the beam quantity are, the larger the value of X will be. For example: as shown in Table 5:

TABLE 5

| N*beam quantity | x |
|---|---|
| ≥Threshold A | 8 |
| <Threshold A | 1 |

For example: the situation that X and the N and the Ns and the quantity of beams of the first signal have a fourth corresponding relationship may include the following:

The network device configures the paging parameters N and Ns and the quantity of beams of the first signal. The value range of N is {T, T/2, T/4, T/8, T/16}, and the value range of Ns is {1, 2, 4}, since the value of X is related to N and Ns and the beam quantity of the first signal, the corresponding relationship between X and N and Ns and the beam quantity of the first signal can be given in a predefined way, and then, the value of X can be determined according to the corresponding relationship between X, N, Ns and the beam quantity of the first signal and the value of N, Ns and the beam quantity of the first signal. When designing the corresponding relationship between X and N and Ns and the beam quantity of the first signal, a better design method is that the larger the value of N*Ns*beam quantity is, the larger the value of X is. For example: as shown in Table 6:

TABLE 6

| N*Ns*beam quantity | x |
|---|---|
| >=A | 8 |
| <A | 1 |

The value of X can be determined according to the corresponding relationship between X and N and the beam quantity of Ns and TRS/PEI in Table 6 and the value of the beam quantity of N and Ns and TRS/PEI. The following examples illustrate:

When the number of N*Ns*beams is greater than or equal to the threshold A, it means that the PO in the DRX cycle are dense, and the more beams of TRS/PEI is, the more resources of TRS/PEI are occupied; therefore, the network device determines that every 8 PO correspond to a sending position of a first signal.

Figure 6:
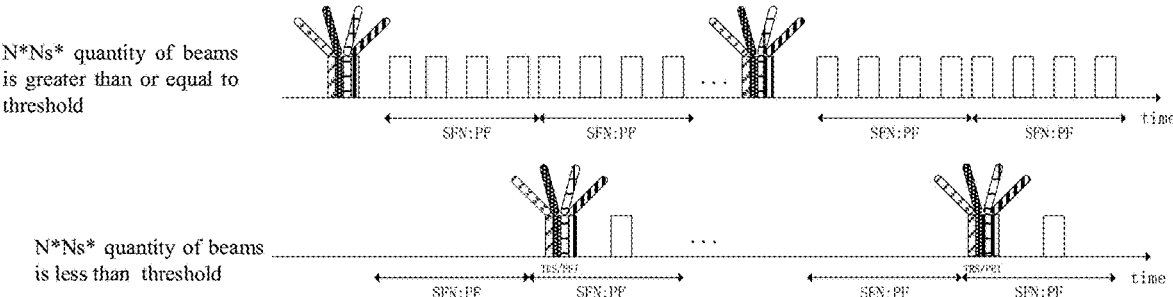

When the number of N*Ns*beams is less than the threshold A, it means that the PO in the DRX cycle are sparse and the quantity of beams of the first signal is not many, and the resource occupation of the first signal is less at this time. Therefore, the network device determines each PO corresponds to a sending position of a TRS/PEI, for example, as shown in FIG. 6.

Optionally, when the first signal includes at least two of TRS, CSI-RS and PEI, and the X has multiple candidate values, the determining the sending position of the first signal corresponding to the X PO/PF include at least two of:

determining the sending position of the TRS corresponding to X1 PO/PF; or determining the sending position of the PEI corresponding to X2 PO/PF; or determining the sending position of the CSI-RS corresponding to X3 PO/PF;

where the X1, X2, and X3 are values among the plurality of candidate values.

The aforementioned X1, X2, and X3 may be the same or different integers.

The above determination of the sending position of the TRS corresponding to X1 PO/PF may be to determine the sending position of a TRS corresponding to X1 PO/PF, such as sending one TRS for every X1 PO/PF;

The above determination of the sending position of the PEI corresponding to X2 PO/PF may be to determine the sending position of a PEI corresponding to X2 PO/PF, such as sending one PEI for every X2 PO/PF;

The above determination of the sending position of the CSI-RS corresponding to the X3 PO/PF may be to determine the sending position of one CSI-RS corresponding to the X3 PO/PF, for example, sending one CSI-RS for every X3 PO/PF.

In this embodiment, the TRS, CSI-RS, and PEI can be flexibly configured through the aforementioned X1, X2, and X3.

Optionally, at least two of the X1, X2 and X3 have a fifth corresponding relationship with the N; or at least two of the X1, X2 and X3 have a sixth corresponding relationship with the Ns; or at least two of the X1, X2 and X3 have a seventh corresponding relationship with the N and the Ns; or at least two of the X1, X2 and X3 have an eighth corresponding relationship with the N, the Ns and the quantity of beams of the first signal.

The above corresponding relationship may be pre-configured or stipulated in a protocol. In addition, the above corresponding relationship may be a relational table or a functional relationship.

For example: when at least two of the above X1, X2, and X3 have a fifth corresponding relationship with the N, it may include the following:

After the network device determines a value of the parameter N, the network device can determine the sending position of every X1 PF corresponding to a TRS, the network device can determine the sending position of every X2 PF corresponding to a PEI, and the setting of X1 and X2 The value is related to N, and the value of X1 and the value of X2 can be the same or different. In the above Table 1, an X is determined by N, which means that X1=X2=X, that is, no matter it is TRS or PEI, each X PF corresponds to a sending position of a first signal.

The two values of X1 and X2 are determined by N in the following Table 7. At this time, it is explained that the sending position of TRS is determined by every X1 PF, and the sending position of PEI is determined by every X2 PF. For the same value of N, the values of X1 and X2 may be the same or different. In Table 7, as predefined in the protocol, the TRS determines the TRS sending position according to the column where X1 is located, and the PEI determines the sending position of the PEI through the column where X2 is located. The present disclosure is not limited thereto, the system message can broadcast to inform that TRS and PEI correspond to any column of X1 and X2.

TABLE 7

| N | X1 | X2 |
|---|----|----|
| T | 4 | 2 |
| T/2 | 2 | 1 |
| T/4 | 1 | 1 |
| T/8 | 1 | 1 |
| T/16 | 1 | 1 |

For TRS or PEI, in addition to the one-to-one correspondence between N and X as shown in Table 1 above, for a certain value of N, there can be multiple possible values of X: X (1), X (2), . . . , X(n). Specifically, the network device may broadcast a system message to notify X is which one of X(1), X(2), . . . , X(n) determined by N, which is not limited in this embodiment. As shown in Table 8.

TABLE 8

| N | X(1) | . . . | X(n) |
|---|------|-------|------|
| T | 4 | . . . | 2 |
| T/2 | 2 | . . . | 1 |
| T/4 | 1 | . . . | 1 |
| T/8 | 1 | . . . | 1 |
| T/16 | 1 | . . . | 1 |

For example: when at least two of the above X1, X2, and X3 have a sixth corresponding relationship with the Ns, it may include the following:

After the network device determines a value of the parameter Ns, the network device can determine the sending position of every X1 PO corresponding to a TRS, and the network device can determine the sending position of every X2 PO corresponding to a PEI, and the values of X1 and X2 are related to Ns, and the value of X1 and the value of X2 can be the same or different. In the above Table 2, an X is determined by Ns, which means that X1=X2=X, that is, whether it is TRS or PEI, each X PF corresponds to a sending position of a TRS/PEI.

The two values of X1 and X2 are determined by Ns in the following table 9. At this time, it is explained that the sending position of TRS is determined by every X1 PF, and the sending position of PEI is determined by every X2 PF. For the same value of Ns, the values of X1 and X2 may be the same or different. In Table 5, as predefined in the protocol, the TRS determines the TRS sending position according to the column where X1 is located, and the PEI determines the sending position of the PEI through the column where X2 is located. The present disclosure is not limited thereto, the system message can be broadcasted to inform that TRS and PEI correspond to any column of X1 and X2.

TABLE 9

| NS | X1 | X2 |
|----|----|----|
| 4 | 8 | 4 |
| 2 | 4 | 2 |
| 1 | 1 | 1 |

For TRS or PEI, in addition to the one-to-one correspondence between Ns and X as shown in Table 2 above, for a certain value of N, there can be multiple possible values of X: X (1), X (2), . . . , X(n). Specifically, the network device may broadcast a system message to notify X is determined as which one of X(1), X(2), . . . , X(n) X by N, which is not limited in this embodiment. As shown in Table 10.

TABLE 10

| NS | X(1) | . . . | (n) |
|----|------|-------|-----|
| 4 | 8 | . . . | 4 |
| 2 | 4 | . . . | 2 |
| 1 | 1 | . . . | 1 |

For example: when at least two of the above X1, X2, and X3 have the seventh corresponding relationship with the N and the Ns, it may include the following:

After the network device determines a value of the parameters N and Ns, the network device can determine that every X1 PO corresponds to the sending position of one TRS, and the network device can determine that every X2 PO corresponds to the sending position of one PEI, and the X1 and X2 The value of is related to N and Ns, and the value of X1 and X2 can be the same or different. In the above table 3, an X is determined by N and Ns. At this time, X1=X2=X, that is, no matter it is TRS or PEI, each X PF corresponds to a sending position of one TRS/PEI.

Two values of X1 and X2 are determined by N and Ns in the following table 11. At this time, the sending position of TRS is determined by every X1 PF, and the sending position of PEI is determined by every X2 PF. For the same N and Ns, the values of X1 and X2 may be the same or different. In Table 10, as predefined in the protocol, the TRS determines the TRS sending position according to the column where X1 is located, and the PEI determines the sending position of the PEI through the column where X2 is located. The present disclosure is not limited thereto, the system message can be broadcasted to inform that TRS and PEI correspond to any column of X1 and X2.

TABLE 11

| N | NS | X1 | X2 |
|---|---|---|---|
| T | 4 | 8 | 4 |
| T | 2 | 4 | 2 |
| T | 1 | 2 | 1 |
| T/2 | 4 | 4 | 2 |
| T/2 | 2 | 2 | 1 |
| T/2 | 1 | 1 | 1 |
| T/4 | 4 | 2 | 1 |
| T/4 | 2 | 1 | 1 |
| T/4 | 1 | 1 | 1 |
| T/8 | 4 | 1 | 1 |
| T/8 | 2 | 1 | 1 |
| T/8 | 1 | 1 | 1 |
| T/16 | 4 | 1 | 1 |
| T/16 | 2 | 1 | 1 |
| T/16 | 1 | 1 | 1 |

For TRS or PEI, in addition to the one-to-one correspondence between N and Ns and X as shown in Table 3, for a certain value of N and Ns, there can be multiple possible values of X $X(1)$, $X(2)$, . . . , $X(n)$. Specifically, the network device may broadcast a system message to notify X is determined as which one of $X(1)$, $X(2)$, . . . , $X(n)$ by N, which is not limited in this embodiment. As shown in Table 12.

TABLE 12

| N | NS | X(1) | . . . | X(n) |
|---|---|---|---|---|
| T | 4 | 8 | . . . | 4 |
| T | 2 | 4 | . . . | 2 |
| T | 1 | 2 | . . . | 1 |
| T/2 | 4 | 4 | . . . | 2 |
| T/2 | 2 | 2 | . . . | 1 |
| T/2 | 1 | 1 | . . . | 1 |
| T/4 | 4 | 2 | . . . | 1 |
| T/4 | 2 | 1 | . . . | 1 |
| T/4 | 1 | 1 | . . . | 1 |
| T/8 | 4 | 1 | . . . | 1 |
| T/8 | 2 | 1 | . . . | 1 |
| T/8 | 1 | 1 | . . . | 1 |
| T/16 | 4 | 1 | . . . | 1 |
| T/16 | 2 | 1 | . . . | 1 |
| T/16 | 1 | 1 | . . . | 1 |

For example: when at least two of the above X1, X2, and X3 have an eighth corresponding relationship with the N, the Ns and the quantity of beams of the first signal, it may include the following:

When the network device determines a value of the parameters N and Ns and the quantity of beams of TRS/PEI, the network device can determine that every X1 PO corresponds to a TRS sending position, and the network device can determine that every X2 PO corresponds to a PEI sending position, the values of X1 and X2 are related to N and Ns and the quantity of beams of the first signal, and the value of X1 and the value of X2 may be the same or different. In the above table 4, an X is determined by N and Ns and the quantity of beams of the first signal. At this time, it is explained that X1=X2=X, that is, no matter it is TRS or PEI, each X PF corresponds to a sending position of a quantity of beams.

Table 13 below determines the two values of X1 and X2 through N and Ns and the quantity of beams of the first signal. At this time, it is explained that the sending position of TRS is determined by every X1 PF, and the sending position of PEI is determined by every X2 PF, for the same N*Ns* value of the quantity of beams of the first signal, the values of X1 and X2 may be the same or different. In Table 11, as predefined in the protocol, the TRS determines the TRS sending position according to the column where X1 is located, and the PEI determines the sending position of the PEI through the column where X2 is located. The present disclosure is not limited thereto, the system message can be broadcasted to inform that TRS and PEI correspond to any column of X1 and X2.

TABLE 13

| N*Ns*beam quantity | X1 | X2 |
|---|---|---|
| >=A | 8 | 8 |
| <A | 1 | 1 |

For TRS or PEI, in addition to the one-to-one correspondence between N and Ns and the quantity of beams of the first signal and X as shown in Table 4 above, for a determined N*Ns* quantity of beams of the first signal (beam quantity), there can be multiple possible values of X: $X(1)$, $X(2)$, . . . , $X(n)$. Specifically, the network device may broadcast a system message to notify that X is determined as which one of $X(1)$, $X(2)$, . . . , $X(n)$ X by the quantity of beams of N*Ns*first signal. This is not limited. As shown in Table 14.

TABLE 14

| N*Ns*beam quantity | X(1) | . . . | X(2) |
|---|---|---|---|
| >=A | 8 | . . . | 8 |
| <A | 1 | . . . | 1 |

As an optional implementation manner, the determining the sending position of the first signal corresponding to the X PO/PF includes:

determining a target PO/PF in the X PO/PF, and determining the sending position of the first signal corresponding to the X PO/PF based on the target PO/PF;

where the target PO/PF is determined by a second parameter of each PO/PF in the X PO/PF.

The aforementioned target PO/PF may be a specific PO/PF among the aforementioned X PO/PF, which is specifically determined by the second parameter.

The above determination of the sending position of the first signal corresponding to the X PO/PF based on the target PF may be determining the sending position of a first signal according to the time slot where the first PO of the target PF is located, or, determining the sending position of a first signal according to the symbol where the first PO of the target PF is located, or determining the sending position of a first signal according to the first symbol of the target PF, or determining a sending position of a first signal according to the first time slot of the target PF.

The above determination of the sending position of the first signal corresponding to the X PO/PF based on the target PO may be determining the sending position of a first signal according to the time slot where the target PO is located, or determining the sending position of a first signal according to the time slot where the slot of the starting position of the MO of the target PO is located, or the network device determining a first signal sending position according to the symbol where the starting position of the first MO of the target PO is located, or determining the sending position of the first signal according to the symbol where the target PO is located, or determining the sending position of the first signal according to the first symbol of the target PO, or determining the sending position of the first signal according to the first time slot of the target PO.

In addition, the relationship of the time slot where the first PO of the target PF is located, the time slot where the target PO is located, the first time slot of the target PF or the first time slot of the target PO, the symbol where the first PO of the target PF is located, the symbol where the target PO is located, the first symbol of a target PF or the first symbol of a target PO and the sending position of the above first signal can be pre-configured, or agreed upon in a protocol, or configured by a network device.

The above determining the target PO by the second parameter of each PO in the X PO may be determining whether the PO is the target PO according to the second parameter of each PO, for example: the PO of which the second parameter is the first preset parameter is the target PO.

The above determining the target PF by the second parameter of each PF in the X PF may be determining whether the PF is the target PF according to the second parameter of each PF, for example: the PF of which the second parameter is the second preset parameter is the target PF.

Optionally, the second parameter of the PO is associated with at least one of:

a system frame number of the PF where the PO is located, the Ns, the i_s corresponding to the PO, and the X, where the i_s represents an index of the PO; and/or the second parameter of the PF is associated with at least one of:

the system frame number of the PF, the X.

The association of the second parameter of the PO with at least one item of the system frame number of the PF where the PO is located, the Ns, the i_s corresponding to the PO, and the X may be, the second parameter of the PO having a functional relationship with at least one of the above items, or the second parameter of the PO having a table mapping relationship with at least one of the above items.

The association of the second parameter of the PF with at least one item of the system frame number of the PF and the X may be, the second parameter of the PF having a functional relationship with at least one of the above items, or the second parameter of the PF having a table mapping relationship with at least one of the above items.

In the above implementation manner, since it is only necessary to determine the sending position of the first signal according to the target PO/PF, resource overhead can be further saved.

Figure 7:
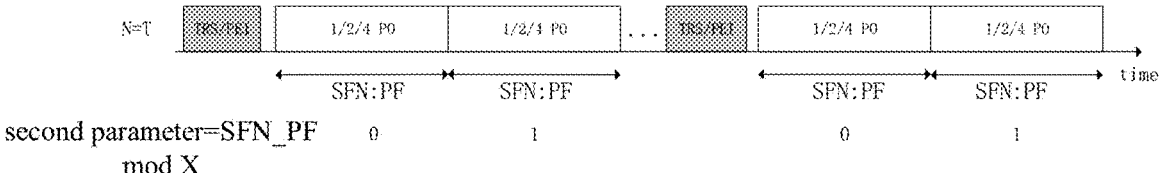

The following example illustrates how the network device determines the target PF among every X PF, as shown in FIG. 7.

Determining the second parameter corresponding to the PF. For example: second parameter=SFN_PF mod X.

When the value of the second parameter is 0, the corresponding PF is the target PF.

It should be noted that, in the embodiment of the present disclosure, the target PF is not limited to the PF corresponding to the value of the second parameter being 0, and the protocol can predefine that the target PF is the PF corresponding to the value of the second parameter being any of $0, \ldots, X-1$. Through the predefined method, the network device and the terminal will not have ambiguity about the second parameter corresponding to the target PF. In addition, the system message may broadcast that the target PF is the PF corresponding to the value of the second parameter being any of $0, \ldots, X-1$. The embodiment of the present disclosure is not limited thereto.

Figure 8:
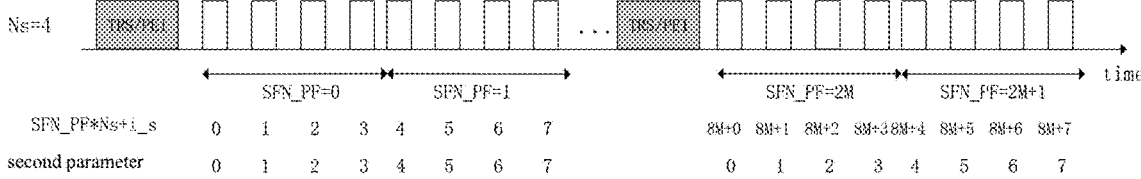

The following example illustrates how the network device determines the target PO among every X PO, as shown in FIG. 8 below.

Determining the second parameter corresponding to the PO. For example: the second parameter=(SFN_PF*Ns+i_s) mod X.

When the value of the second parameter is 0, the corresponding PO is the target PO.

It should be noted that, in the embodiment of the present disclosure, the target PO is not limited to the PF corresponding to the value of the second parameter being 0, and the protocol can predefine that the target PO is the PO corresponding to the value of the second parameter being any of $0, \ldots, X-1$. Through the predefined method, the network device and the terminal will not have ambiguity about the second parameter corresponding to the target PO. In addition, the system message may broadcast that the target PO is the PO corresponding to the value of the second parameter being any of $0, \ldots, X-1$. The embodiment of the present disclosure is not limited thereto.

Figure 9:
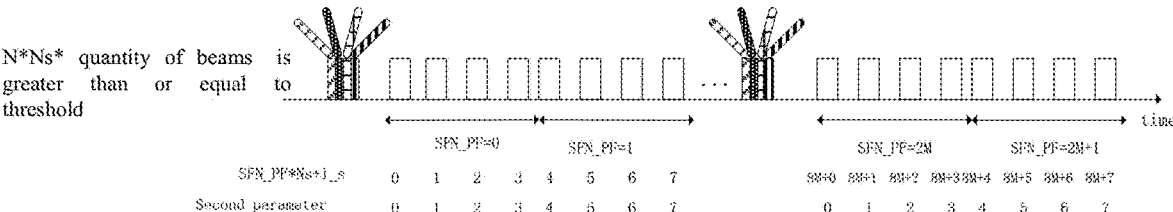

Another example: as shown in FIG. 9:

Determining the second parameter corresponding to the PO. For example: the second parameter=(SFN_PF*Ns+i_s) mod X.

When the value of the second parameter is 0, the corresponding PO is the target PO.

As an optional implementation manner, the communication device determining the sending position of the first signal according to the first parameter includes:

determining, by the communication device, a sending cycle of the first signal according to the first parameter, and determines a sending position of the first signal according to the sending cycle.

where the determining the sending cycle of the first signal according to the first parameter may be determining the sending cycle of the first signal according to a corresponding relationship between the first parameter and the sending cycle of the first signal. The corresponding relationship may be pre-configured or agreed upon in a protocol.

For example: the sending cycle of the above first signal has a ninth corresponding relationship with at least one of: the N, the Ns, and the quantity of beams of the first signal.

The above ninth corresponding relationship may include the following corresponding relationship:

the corresponding relationship between the above N and the sending cycle of the first signal;

the corresponding relationship between the above Ns and the sending cycle of the first signal;

the corresponding relationship between the quantity of beams of the first signal and the sending cycle of the first signal;

the corresponding relationship between the above N, Ns and the sending cycle of the first signal;

the corresponding relationship between the quantity of beams of the above N and the first signal and the sending cycle of the first signal;

the above Ns, the corresponding relationship between the quantity of beams of the first signal and the sending cycle of the first signal;

the corresponding relationship between the above N, Ns, the quantity of beams of the first signal and the sending cycle of the first signal;

Further, the above corresponding relationship may be a relationship table or a relationship function.

The above determination of the sending position of the first signal according to the sending cycle may be selecting a specific position in the sending cycle as the sending position of the first signal, for example: selecting a preset configuration as the sending position of the first signal, or determining the sending position of the first signal in the above sending cycle according to the offset.

For example: the network device configures the paging parameter N and/or Ns and/or the quantity of beams of the first signal, and the value range of N is {T, T/2, T/4, T/8, T/16}, Ns The value range of is {1, 2, 4}; since the value of the sending cycle of the first signal is related to N and Ns, the corresponding relationship between the sending cycle of the first signal and N and Ns can be given in a predefined way Furthermore, the sending cycle of the first signal may be determined according to the corresponding relationship between the sending cycle of the first signal and N and Ns, and the values of N and Ns. Because N*Ns can be configured to describe the number of PO in the DRX cycle, the larger the value of N and Ns, the more the number of PO. At this time, when designing the value of the sending cycle of the first signal and the correspondence between N and Ns When there is a relationship, a better design method is that the larger the value of N*Ns is, the smaller the value of the sending cycle of the first signal is. For example: as shown in Table 15:

TABLE 15

| N | NS | First signal cycle (slots or ms) |
| --- | --- | --- |
| T | 4 | 10 |
| T | 2 | 10 |
| T | 1 | 10 |
| T/2 | 4 | 10 |
| T/2 | 2 | 10 |
| T/2 | 1 | 20 |
| T/4 | 4 | 10 |
| T/4 | 2 | 40 |
| T/4 | 1 | 40 |
| T/8 | 4 | 20 |
| T/8 | 2 | 40 |
| T/8 | 1 | 80 |
| T/16 | 4 | 40 |
| T/16 | 2 | 80 |
| T/16 | 1 | 160 |

When the values of N and Ns are relatively large, the PO in the DRX cycle are dense; therefore, the network device determines that the sending cycle of the first signal is relatively small.

When the values of N and Ns are relatively small, the PO in the DRX cycle are sparse; therefore, the network device determines that the sending cycle of the first signal is relatively large.

In the specific example given in Table 15, although the first signal is sent with a smaller cycle when PO are dense, the first signal is not sent before each PO. For example, when N=T, Ns=4, TRS The cycle of/PEI is equal to 10 slots, and at this time, the cycle of the first signal contains 4 PO. This cycle can reduce the resource overhead of the first signal and the possibility of collision between the first signal and the PO. When PO are sparse, the first signal is sent with a relatively large cycle. At this time, the first signal is sent before each PO.

Optionally, when the sending cycle of the first signal is less than or equal to a first threshold, the sending position of the first signal is determined according to the sending position of the first PO of the PF and the first offset; or when the sending cycle of the first signal is greater than the first threshold, the sending position of the first signal is based on the sending position and a first offset of the first PO of the PF, i_s and the sending cycle, the i_s represents the index of the PO in the PF;

where the first offset is a time-domain interval between the sending position of the first signal and the sending position of the first PO of the PF.

the above first offset may be pre-configured or stipulated in a protocol. The above first threshold may be pre-configured or stipulated in a protocol. The foregoing PF may be a PF corresponding to the foregoing sending cycle.

For example: the first offset is spaced between the end position of the transmission of the first signal and the start position of the transmission of the first PO. For example, there is an interval of the first offset between the end position of the transmission of TRS and the start position of the transmission of the first PO, or the interval between the end position of the transmission of PEI and the start position of the transmission of the first PO by the above first offset, or the first offset is spaced between the end position of the CSI-RS transmission and the start position of the first PO transmission.

The sending position of the first signal being determined according to the sending position of the first PO of the PF and the first offset may be, the sending position of the first signal is prior to the sending position of the first PO in the PF, and separated with the sending position of the first PO in the PF by the above first offset. For example: the sending position of the first signal is equal to: the sending position of the first PO of the above PF—first offset.

The sending position of the first signal being determined according to the sending position of the first PO of the PF, the first offset, i_s and the sending cycle may be, the sending position of the first signal is equal to the sending position of the first PO of the above PF—is first offset+i_s*the sending cycle. Alternatively, the sending position of the first signal being determined according to the sending position of the first PO of the PF, the first offset, i_s and the sending cycle may be, determining according to a correspondence relationship between the offset, i_s, the sending cycle and the sending position of the first signal, which is not limited.

In the above embodiment, the sending cycle of the first signal can be determined according to the first parameter, and then the sending position of the first signal can be determined according to the sending cycle, so that the sending position of the first signal in each sending cycle can be accurately determined.

Figure 10:
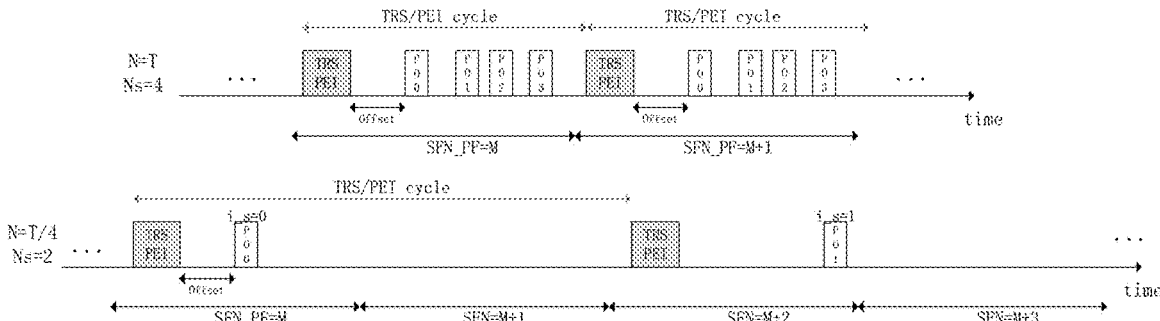

In an implementation manner, the sending cycle of the above first signal is less than or equal to the first threshold may include: in the case of the above N>=T, for example: in the case of N>=T, for example: as shown in FIG. 10, the sending position of the first signal=the position of the first PO of the PF—Offset (the first offset above);

the above first signal is greater than the first threshold may include: in the case of the above N<T, for example: when N<T, as shown in FIG. 10, the sending position of the first signal=the first PO of the PF The position–Offset+i_s*the above sending cycle.

It should be noted that in the embodiment of the present disclosure, after the network device determines a value of the parameters N and Ns, the network device can determine the TRS sending cycle T1, and the network device can determine the PEI sending cycle T2, and the values of T1 and T2 are related to N and Ns, and the values of T1 and T2 can be the same or different.

As an optional implementation manner, when the first signal includes at least two of TRS, CSI-RS and PEI, the determining the sending position of the first signal includes:

determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

For example: the sending position of the TRS and the sending position of the PEI are continuous in time domain; or the sending position of the TRS and the sending position of the PEI are at a fixed preset interval in time domain; or an offset between the sending position of the TRS and the sending position of the PEI is an offset of the PEI relative to the PO; or the sending position of the CSI-RS is continuous in time domain with the sending position of the PEI; or the sending position of the CSI-RS and the sending position of the PEI are at a fixed preset interval in time domain; or an offset between the sending position of the CSI-RS and the sending position of the PEI is an offset of the PEI relative to the PO.

The sending position of the above TRS and the sending position of the PEI may be continuous in time domain, the end position of the sending of the TRS and the starting position of the sending of the PEI are continuous in time domain, or the ending position of the sending of the PEI and the sending of the TRS The starting positions of are continuous in time domain. The sending position of the CSI-RS and the sending position of the PEI being continuous in time domain may be that the end position of the sending of the CSI-RS and the starting position of sending the PEI are continuous in time domain, or the end of the sending of the PEI The position and the start position of CSI-RS transmission are consecutive in time domain.

Optionally, the PEI is a target PEI among multiple PEI.

The foregoing multiple PEI may be multiple PEI configured in one or more PF, such as multiple PEI configured in X PF, or PEI configured for multiple PO in a scenario where PO are dense. The above target PEI may be a PEI at a preset position of the above multiple PEI, for example: the first PEI among the multiple PEI, or a middle PEI, and the like.

Figure 11:
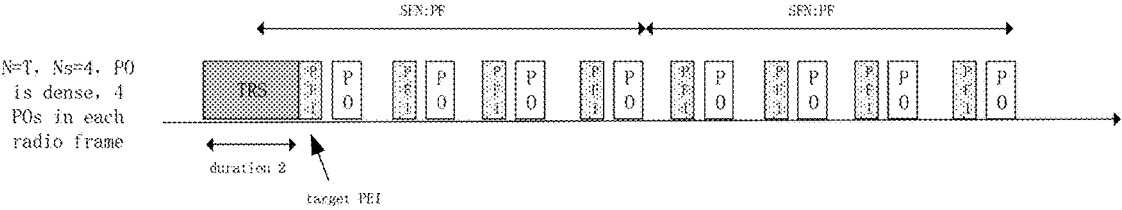

For example: As shown in FIG. 11 above, a PEI is configured prior to each PO, but only configure a TRS before the target PEI. It should be noted that, in FIG. 11, the network device determines the sending position of the TRS according to the sending position of the PEI as an example, and the same for determining the sending position of the PEI according to the sending position of the TRS.

In some implementation manners, the network device may configure a PEI for the PO corresponding to the terminal, for example: configure a PEI in a PF, or configure a PEI for X PO/PF.

X PO are spaced between two TRSs, so that one TRS and one PEI are configured for every X PO.

Further, in FIG. 12, the starting position of the TRS can be determined by the following formula:

TRS_Start=PEI_Start-duration2. Here, duration2 is the duration of the TRS. The duration2 may be specified by the protocol, or notified by a system message or an RRC message, which is not limited in this embodiment.

In this embodiment, it is possible to determine the sending position of another or two signals according to the sending position of one of the above TRS, CSI-RS, and PEI signals, so that the sending position of the other or two signals does not need to be determined according to signaling, so as to further save the power consumption of the terminal.

For example: the network device needs to send the PEI configured to indicate the existence of paging and the TRS used for channel tracking for the terminal in RRC Idle/Inactive mode. The network device or terminal can determine the sending position of the PEI according to the sending position of the TRS, or, determine the sending position of the TRS according to the sending position of the PEI.

As an optional implementation, the method also includes:

when the communication device is a terminal, the terminal receives the first signal at the sending position of the first signal; or when the communication device is a network device, the network device sends the first signal at the sending position of the first signal.

It should be noted that, in the embodiments of the present disclosure, the sending position of the first signal may also be referred to as the receiving location of the first signal for the terminal.

For example, the network device configures the first parameter, the network device determines the sending position of the first signal according to the first parameter, and sends the first signal at the sending position.

For example: the terminal acquires the first parameter, determines the receiving location of the first signal according to the first parameter, and receives the first signal at the receiving location.

According to the embodiment of the present disclosure, the communication device determines the first parameter; the communication device determines the sending position of the first signal according to the first parameter, where the first signal includes at least one of: tracking reference signal (TRS), Channel state information reference signal CSI-RS, paging early indication (PEI); the first parameter includes at least one of: paging-related parameter; the quantity of beams of the first signal. Since the sending position of the first signal does not need to be determined according to the RRC signaling, the power consumption of the communication device can be reduced.

Please refer to FIG. 13. FIG. 13 is a flow chart of another method for determining a sending position in an embodiment of the present disclosure. As shown in FIG. 13, it includes the following steps:

Step 1301, determining, by a communication device, a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

The above second signal may be the first signal in the embodiment shown in FIG. 2, the third signal may be TRS, CSI-RS, PEI in the embodiment shown in FIG. 2, the sending position of the second signal and For details of the sending position of the third signal, refer to the manner of determining the sending position of the first signal above, which will not be repeated here.

For example: determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

Optionally, the sending position of the second signal is determined according to a first parameter, and the first parameter includes at least one of:

a paging-related parameter;

The quantity of beams of the second signal.

In this embodiment, through the above steps, the sending position of the third signal can be determined according to the sending position of the second signal, thereby saving power consumption of the communication device.

It should be noted that, in the embodiment of the present disclosure, the network device sends the first signal at the sending position, and the corresponding behavior on the terminal side is that the terminal receives the first signal at the receiving location. However, it does not mean that the network device will definitely send the first signal at the sending position. Whether the network device will send the first signal at the sending position depends on the specific function of the first signal. The sending/receiving location of the first signal. For example, if the PEI is configured to indicate that there is a paging DCI at the PO, the network device will only send the PEI at the sending position if there is a paging DCI at the PO. At this time, the terminal will determine the reception position of the PEI according to the terminal side, and detect the PEI, and finally the terminal receives the PEI. When there is no paging DCI at the PO, the network device will not send the PEI at the determined sending position. At this time, the terminal will determine the receiving location of the PEI according to the terminal side and detect the PEI, and finally the terminal cannot receive the PEI.

In an embodiment of the present disclosure, the PEI may be a DCI-based PEI (DCI-based PEI) or a sequence-based PEI (sequence-based PEI), where the sequence-based PEI may be a TRS-based PEI (TRS-based PEI) or CSI-RS-based PEI (CSI-RS-based PEI) or secondary synchronization signal-based PEI (SSS-based PEI).

In an embodiment of the present disclosure, no limitation is imposed on the specific form, type, or format of the PEI. of the present disclosure, PEI can be configured to indicate at least one of:

Whether there is a paging DCI at the PO, or whether the PO is monitoring the paging DCI, or whether it is monitoring the paging message, or whether it needs to wake up to monitor the paging message in this paging cycle;

There is a paging message at the PO, or the PO monitors the paging DCI, or monitors the paging message, or needs to wake up to monitor the paging message in this paging cycle.

In an embodiment of the present disclosure, in some communication systems (for example: NR system), a TRS contains one time slot or two time slots. In the embodiment of the present disclosure, the pattern of a TRS can be consistent with the communication system (e.g., NR), that is, occupying at least one time slot, two CSI-RS symbols can be separated by 4 OFDM symbols, but the number of time slots occupied by TRS is not limited by the communication system (for example: NR), and can be multiple time slots. In a broader sense, the CSI-RS with the channel tracking function is within the scope of the embodiments of the present disclosure.

For example: the network device sends TRS/PEI for the terminal in RRC Idle/Inactive mode. It usually takes 3 SSB cycles, that is, 60 ms, for the terminal to obtain accurate synchronization when the signal-to-noise ratio is low, and the power consumption of the terminal is relatively large at this time. TRS helps the terminal to obtain accurate synchronization faster, without requiring 60 ms, thereby saving terminal power consumption. PEI is configured to indicate whether there is a paging DCI for scheduling paging messages. Assume that the paging probability at PO is 10%, that is, there is only a 10% probability of paging DCI for scheduling paging messages in PO, then the terminal has only The PEI is detected with a probability of 10%, and the terminal cannot detect the PEI with a probability of 90%. Then, the terminal decodes the PDCCH and PDSCH of the paging message, thereby reducing the power consumption of the terminal.

Please refer to FIG. 14. FIG. 14 is a structural diagram of a communication device in an embodiment of the present disclosure. As shown in FIG. 14, it includes a memory 1420, a transceiver 1400 and a processor 1410:

The memory 1420 is configured to store computer programs; the transceiver 1400 is configured to send and receive data under the control of the processor 1410; the processor 1410 is configured to read the computer programs in the memory 1420 to perform:

determining a first parameter;

determining a sending position of a first signal according to the first parameter, where the first signal includes at least one of:

a tracking reference signal (TRS), a channel state information reference signal (CSI-RS), and a paging early indication (PEI);

the first parameter includes at least one of:

a paging-related parameter;

a quantity of beams of the first signal.

where in FIG. 14, the bus architecture may include any number of interconnected buses and bridges, specifically one or more processors represented by the processor 1410 and various circuits of the memory represented by the memory 1420 are linked together. The bus architecture can also link together various other circuits such as peripherals, voltage regulators, and power management circuits, etc., which are well known in the art and therefore will not be further described herein. The bus interface provides the interface. Transceiver 1400 may be a plurality of elements, including transmitters and receivers, providing means for communicating with various other devices over transmission media, including wireless channels, wired channels, fiber optic cables, etc. transmission medium. For different user equipment, the user interface 1430 may also be an interface capable of connecting externally and internally to required devices, and the connected devices include but not limited to keypads, displays, speakers, microphones, joysticks, and the like.

The processor 1410 is responsible for managing the bus architecture and general processing, and the memory 1420 can store data used by the processor 1400 when performing operations.

Optionally, the processor 1410 may be a CPU (Central Processing Device), ASIC (Application Specific Integrated Circuit, Application Specific Integrated Circuit), FPGA (Field-Programmable Gate Array, Field Programmable Gate Array) or CPLD (Complex Programmable Logic Device, complex programmable logic device), the processor can also adopt a multi-core architecture.

The processor is used to execute any one of the methods provided by the embodiments of the present disclosure according to the obtained executable instructions by calling the computer program stored in the memory. Processor and memory can also be physically separated.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the determining by the communication device the sending position of the first signal according to the first parameter includes:

determining, by the communication device, the sending position of the first signal corresponding to the X PO/PF according to the first parameter.

Optionally, the X is configured by a network device; or when the paging-related parameter does not include the X, the X is determined according to the paging-related parameter; or when the paging-related parameter does not include the X, the X is determined according to the quantity of beams of the first signal; or when the paging-related parameter does not include the X, the X is determined according to the paging-related parameter and the quantity of beams of the first signal.

Optionally, the X is configured by the network device, including:

the X is configured by the network device through a system message.

Optionally, the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

Optionally, the value of X is 1, or 2, or 4, or 8.

Optionally, a maximum quantity of PF corresponding to X PO is 2, and a maximum quantity of PF corresponding to one PEI is 2.

Optionally, when the first signal includes at least two of TRS, CSI-RS and PEI, and the X has multiple candidate values, the determining the sending position of the first signal corresponding to the X PO/PF include at least two of:

determining the sending position of the TRS corresponding to X1 PO/PF; or determining the sending position of the PEI corresponding to X2 PO/PF; or determining the sending position of the CSI-RS corresponding to X3 PO/PF;

where the X1, X2, and X3 are values among the plurality of candidate values.

Optionally, at least two of the X1, X2 and X3 have a fifth corresponding relationship with the N; or at least two of the X1, X2 and X3 have a sixth corresponding relationship with the Ns; or at least two of the X1, X2 and X3 have a seventh corresponding relationship with the N and the Ns; or at least two of the X1, X2 and X3 have an eighth corresponding relationship with the N, the Ns and the quantity of beams of the first signal.

Optionally, the determining the sending position of the first signal corresponding to the X PO/PF includes:

determining a target PO/PF in the X PO/PF, and determining the sending position of the first signal corresponding to the X PO/PF based on the target PO/PF;

where the target PO/PF is determined by a second parameter of each PO/PF in the X PO/PF.

Optionally, the second parameter of the PO is associated with at least one of:

a system frame number of the PF where the PO is located, the Ns, the i_s corresponding to the PO, and the X, where the i_s represents an index of the PO; and/or the second parameter of the PF is associated with at least one of:

the system frame number of the PF, the X.

Optionally, the determining by the communication device the sending position of the first signal according to the first parameter includes:

determining, by the communication device, a sending cycle of the first signal according to the first parameter, and determining the sending position of the first signal according to the sending cycle.

Optionally, when the sending cycle of the first signal is less than or equal to a first threshold, the sending position of the first signal is determined according to the sending position of the first PO of the PF and a first offset; or when the sending cycle of the first signal is greater than the first threshold, the sending position of the first signal is determined according to the sending position of the first PO of the PF, a first offset, i_s and the sending cycle, the i_s represents an index of the PO in the PF;

where the first offset is a time-domain interval between the sending position of the first signal and the sending position of the first PO of the PF.

Optionally, the sending cycle of the first signal has a ninth corresponding relationship with at least one of:

the N, the Ns, and the quantity of beams of the first signal.

Optionally, when the first signal includes at least two of TRS, CSI-RS and PEI, the determining the sending position of the first signal includes:

determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

Optionally, the sending position of the TRS is contiguous in time domain with the sending position of the PEI; or the sending position of the TRS and the sending position of the PEI are at a fixed preset interval in time domain; or an offset between the sending position of the TRS and the sending position of the PEI is an offset of the PEI relative to the PO; or the sending position of the CSI-RS is continuous in time domain with the sending position of the PEI; or the sending position of the CSI-RS and the sending position of the PEI are at a fixed preset interval in time domain; or an offset between the sending position of the CSI-RS and the sending position of the PEI is an offset of the PEI relative to the PO.

Optionally, the PEI is a target PEI of a plurality of PEIs.

Optionally, the processor 1410 is configured to read the computer programs in the memory 1420 to perform:

when the communication device is a terminal, receiving the first signal at the sending position of the first signal; or when the communication device is a network device, sending the first signal at the sending position of the first signal.

It should be noted here that the above communication device in an embodiment of the present disclosure can implement all the method steps implemented by the above method embodiments, and can achieve the same technical effect. The same parts and beneficial effects are described in detail.

Please refer to FIG. 15. FIG. 15 is a structural diagram of a communication device in an embodiment of the present disclosure. As shown in FIG. 15, it includes a memory 1520, a transceiver 1500 and a processor 1510:

The memory 1520 is configured to store computer programs; the transceiver 1500 is configured to send and receive data under the control of the processor 1510; the processor 1510 is configured to read the computer programs in the memory 1520 to perform:

determining a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

where in FIG. 15, the bus architecture may include any number of interconnected buses and bridges, specifically one or more processors represented by the processor 1510 and various circuits of the memory represented by the memory 1520 are linked together. The bus architecture can also link together various other circuits such as peripherals, voltage regulators, and power management circuits, etc., which are well known in the art and therefore will not be further described herein. The bus interface provides the interface. Transceiver 1500 may be a plurality of elements, including a transmitter and a receiver, providing means for communicating with various other devices over transmission media, including wireless channels, wired channels, fiber optic cables, etc. Transmission medium. For different user devices, the user interface 1530 may also be an interface capable of connecting externally and internally to required devices, and the connected devices include but not limited to keypads, displays, speakers, microphones, joysticks, and the like.

The processor 1510 is responsible for managing the bus architecture and general processing, and the memory 1520 can store data used by the processor 1500 when performing operations.

Optionally, the processor 1510 may be a CPU (central processor), ASIC (Application Specific Integrated Circuit, application specific integrated circuit), FPGA (Field-Programmable Gate Array, field programmable gate array) or CPLD (Complex Programmable Logic Device), the processor can also adopt a multi-core architecture.

The processor is used to execute any one of the methods provided by the embodiments of the present disclosure according to the obtained executable instructions by calling the computer program stored in the memory. Processor and memory can also be physically separated.

Optionally, the sending position of the second signal is determined according to a first parameter, and the first parameter includes at least one of:

a paging-related parameter;

a quantity of beams of the second signal.

It should be noted here that the above communication device in an embodiment of the present disclosure can implement all the method steps implemented by the above method embodiments, and can achieve the same technical effect. The same parts and beneficial effects are described in detail.

Figure 16:
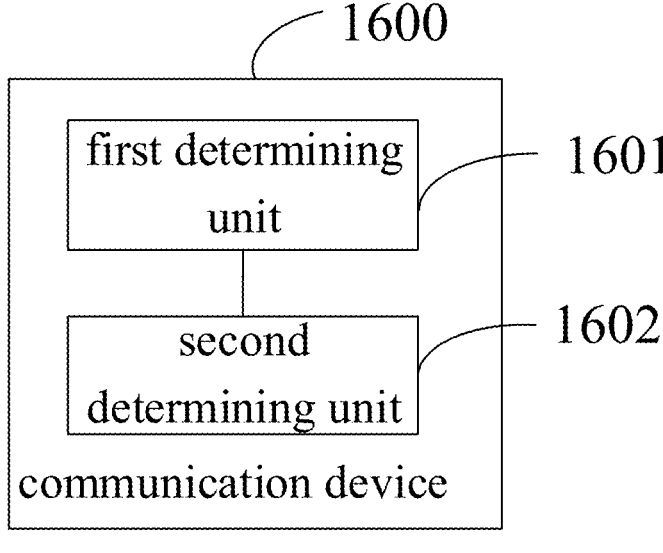
FIG. 16 is a structural diagram of another communication device in an embodiment of the present disclosure.

FIG. 16 is a structural diagram of another communication device in an embodiment of the present disclosure. As shown in FIG. 16, a communication device 1600 includes:

a first determining unit 1601, configured to determine a first parameter;

a second determining unit 1602, configured to determine a sending position of a first signal according to the first parameter, where the first signal includes at least one of:

a tracking reference signal (TRS), a channel state information reference signal (CSI-RS), and a paging early indication (PEI);

the first parameter includes at least one of:

a paging-related parameter;

a quantity of beams of the first signal.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the determining by the communication device the sending position of the first signal according to the first parameter includes:

determining, by the communication device, the sending position of the first signal corresponding to the X PO/PF according to the first parameter.

Optionally, the X is configured by a network device; or when the paging-related parameter does not include the X, the X is determined according to the paging-related parameter; or when the paging-related parameter does not include the X, the X is determined according to the quantity of beams of the first signal; or when the paging-related parameter does not include the X, the X is determined according to the paging-related parameter and the quantity of beams of the first signal.

Optionally, the X is configured by the network device, including:

the X is configured by the network device through a system message.

Optionally, the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

Optionally, the value of X is 1, or 2, or 4, or 8.

Optionally, a maximum quantity of PF corresponding to X PO is 2, and a maximum quantity of PF corresponding to one PEI is 2.

Optionally, when the first signal includes at least two of TRS, CSI-RS and PEI, and the X has multiple candidate values, the determining the sending position of the first signal corresponding to the X PO/PF include at least two of:

determining the sending position of the TRS corresponding to X1 PO/PF; or determining the sending position of the PEI corresponding to X2 PO/PF; or determining the sending position of the CSI-RS corresponding to X3 PO/PF;

where the X1, X2, and X3 are values among the plurality of candidate values.

Optionally, at least two of the X1, X2 and X3 have a fifth corresponding relationship with the N; or at least two of the X1, X2 and X3 have a sixth corresponding relationship with the Ns; or at least two of the X1, X2 and X3 have a seventh corresponding relationship with the N and the Ns; or at least two of the X1, X2 and X3 have an eighth corresponding relationship with the N, the Ns and the quantity of beams of the first signal.

Optionally, the determining the sending position of the first signal corresponding to the X PO/PF includes:

determining a target PO/PF in the X PO/PF, and determining the sending position of the first signal corresponding to the X PO/PF based on the target PO/PF;

where the target PO/PF is determined by a second parameter of each PO/PF in the X PO/PF.

Optionally, the second parameter of the PO is associated with at least one of:

a system frame number of the PF where the PO is located, the Ns, the i_s corresponding to the PO, and the X, where the i_s represents an index of the PO; and/or the second parameter of the PF is associated with at least one of:

the system frame number of the PF, the X.

Optionally, the determining by the communication device the sending position of the first signal according to the first parameter includes:

determining, by the communication device, a sending cycle of the first signal according to the first parameter, and determining the sending position of the first signal according to the sending cycle.

Optionally, when the sending cycle of the first signal is less than or equal to a first threshold, the sending position of the first signal is determined according to the sending position of the first PO of the PF and a first offset; or when the sending cycle of the first signal is greater than the first threshold, the sending position of the first signal is determined according to the sending position of the first PO of the PF, a first offset, i_s and the sending cycle, the i_s represents an index of the PO in the PF;

where the first offset is a time-domain interval between the sending position of the first signal and the sending position of the first PO of the PF.

Optionally, the sending cycle of the first signal has a ninth corresponding relationship with at least one of:

the N, the Ns, and the quantity of beams of the first signal.

Optionally, when the first signal includes at least two of TRS, CSI-RS and PEI, the determining the sending position of the first signal includes:

determining the sending position of at least one of the CSI-RS and PEI according to the sending position of the TRS, where the sending position of the TRS is determined according to the first parameter; or determining the sending position of at least one of the CSI-RS and TRS according to the sending position of the PEI, where the sending position of the PEI is determined according to the first parameter; or determining the sending position of at least one of the PEI and TRS according to the sending position of the CSI-RS, where the sending position of the CSI-RS is determined according to the first parameter.

Optionally, the sending position of the TRS is contiguous in time domain with the sending position of the PEI; or the sending position of the TRS and the sending position of the PEI are at a fixed preset interval in time domain; or an offset between the sending position of the TRS and the sending position of the PEI is an offset of the PEI relative to the PO; or the sending position of the CSI-RS is continuous in time domain with the sending position of the PEI; or the sending position of the CSI-RS and the sending position of the PEI are at a fixed preset interval in time domain; or an offset between the sending position of the CSI-RS and the sending position of the PEI is an offset of the PEI relative to the PO.

Optionally, the PEI is a target PEI of a plurality of PEIs.

Optionally, the communication device further includes:

a first sending unit, configured to, when the communication device is a terminal, receive the first signal at the sending position of the first signal; or a second sending unit, configured to, when the communication device is a network device, send the first signal at the sending position of the first signal.

It should be noted here that the above communication device in an embodiment of the present disclosure can implement all the method steps implemented by the above method embodiments, and can achieve the same technical effect. The same parts and beneficial effects are not described in detail again.

Figure 17:
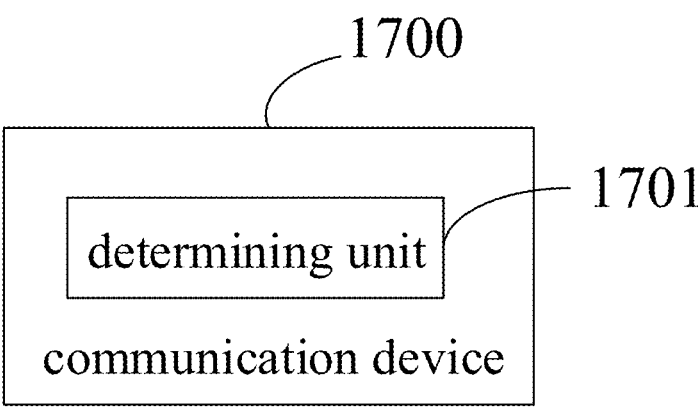
FIG. 17 is a structural diagram of another communication device in an embodiment of the present disclosure.

FIG. 17 is a structural diagram of another communication device in an embodiment of the present disclosure. As shown in FIG. 17, a communication device 1700 includes:

a determining unit 1701, configured to determine a sending position of a third signal according to a sending position of a second signal;

where the second signal is a signal among a tracking reference signal (TRS), a channel state information reference signal (CSI-RS), and a paging early indication (PEI), and the third signal is a signal among the TRS, the CSI-RS and the PEI other than the second signal.

Optionally, the sending position of the second signal is determined according to a first parameter, and the first parameter includes at least one of:

a paging-related parameter;

a quantity of beams of the second signal.

Optionally, the paging-related parameter includes at least one of:

N, Ns, T, a target physical downlink control channel (PDCCH) monitoring occasion, X;

where the N is a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO/PF corresponding to one first signal.

Optionally, the X is configured by a network device through a system message.

Optionally, the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

Optionally, the value of X is 1, or 2, or 4, or 8.

Optionally, a maximum quantity of PF corresponding to X PO is 2, and a maximum quantity of PF corresponding to one PEI is 2.

It should be noted here that the above communication device in an embodiment of the present disclosure can implement all the method steps implemented by the above method embodiments, and can achieve the same technical effect. The same parts and beneficial effects are not described in detail again.

It should be noted that the division of the units in the embodiment of the present disclosure is schematic, and is only a logical function division, and there may be another division manner in actual implementation. In addition, each functional unit in each embodiment of the present disclosure may be integrated into one processing unit, each unit may exist separately physically, or two or more units may be integrated into one unit. The above integrated units can be implemented in the form of hardware or in the form of software functional units.

If the integrated unit is realized in the form of a software function unit and sold or used as an independent product, it can be stored in a processor-readable storage medium. Based on such an understanding, the essence of the technical solution of the present disclosure or the part that contributes to the related technology or all or part of the technical solution can be embodied in the form of a software product, and the computer software product is stored in a storage medium. Several instructions are included to make a computer device (which may be a personal computer, a server, or a network device, etc.) or a processor (processor) execute all or part of the steps of the methods described in the various embodiments of the present disclosure. The aforementioned storage media include: U disk, mobile hard disk, read-only memory (Read-Only Memory, ROM), random access memory (Random Access Memory, RAM), magnetic disk or optical disk and other media that can store program codes.

The embodiment of the present disclosure also provides a processor-readable storage medium, the processor-readable storage medium stores a computer program, and the computer program is configured to enable the processor to execute the sending position determination method provided in the embodiment of the present disclosure.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to magnetic disk storage, optical storage, etc.) having computer-usable program code embodied therein.

The present disclosure is described with reference to flowchart illustrations and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce Means for realizing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions may also be loaded into a computer or other programmable data processing device, causing a series of operational steps to be performed on the computer or other programmable device to produce a computer-implemented processing, so that instructions executed on computers or other programmable devices provide steps for realizing the functions specified in one or more procedures of the flow chart and/or one or more blocks of the block diagram.

It should be noted that it should be understood that the division of the above modules is only a division of logical functions, and may be fully or partially integrated into a physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the determining module may be a separate processing element, or may be integrated into a certain chip of the above device. In addition, it may also be stored in the memory of the above device in the form of program code, and a certain processing element of the above device may Call and execute the functions of the modules identified above. The implementation of other modules is similar. In addition, all or part of these modules can be integrated together, and can also be implemented independently. The processing element mentioned here may be an integrated circuit with signal processing capabilities. In the implementation process, each step of the above method or each module above can be completed by an integrated logic circuit of hardware in the processor element or an instruction in the form of software.

For example, each module, unit, subunit or submodule may be one or more integrated circuits configured to implement the above method, for example: one or more specific integrated circuits (Application Specific Integrated Circuit, ASIC), or, one or Multiple microprocessors (digital signal processor, DSP), or, one or more field programmable gate arrays (Field Programmable Gate Array, FPGA), etc. For another example, when one of the above modules is implemented in the form of a processing element scheduling program code, the processing element may be a general-purpose processor, such as a central processing unit (Central Processing Unit, CPU) or other processors that can call program codes. For another example, these modules can be integrated together and implemented in the form of a system-on-a-chip (SOC).

The terms "first", "second" and the like in the specification and claims of the present disclosure are configured to distinguish similar objects, and are not necessarily configured to describe a specific order or sequence. It should be understood that the data so used may be interchanged under appropriate circumstances such that the embodiments of the disclosure described herein are practiced, for example, in sequences other than those illustrated or described herein. Furthermore, the terms "including" and "having", as well as any variations thereof, are intended to cover a non-exclusive inclusion, for example, a process, method, system, product or device including a sequence of steps or elements is not necessarily limited to the expressly listed instead, may include other steps or elements not explicitly listed or inherent to the process, method, product or apparatus. In addition, the use of "and/or" in the description and claims means at least one of the connected objects, such as A and/or B and/or C, means that it includes A alone, B alone, C alone, and both A and B Existence, both B and C exist, both A and C exist, and there are 7 situations where A, B, and C all exist. Similarly, the use of "at least one of A and B" in the present specification and claims should be understood as "A alone, B alone, or both A and B exist".

Obviously, those skilled in the art can make various changes and modifications to the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A method for determining a sending position, comprising:
determining a first parameter by a communication device;
determining, by the communication device, a sending position of a first signal according to the first parameter, wherein the first signal comprises a paging early indication (PEI);
the first parameter comprises at least one of:
a paging-related parameter;
a quantity of beams of the first signal;
the paging-related parameter comprises at least one of:
N, Ns, T, a target physical downlink control channel (PDCCH) monitoring occasion, X;
wherein the Nis a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO corresponding to one first signal or a quantity of PF corresponding to one first signal;
the determining by the communication device the sending position of the first signal according to the first parameter comprises:
determining, by the communication device, the sending position of the first signal corresponding to the X PO/PF according to the first parameter;
the determining the sending position of the first signal corresponding to the X PO/PF comprises:
determining a target PO/PF corresponding to the X PO/PF, and determining the sending position of the first signal corresponding to the X PO/PF based on the target PO/PF;
wherein the target PO/PF is determined by a second parameter of each PO/PF in the X PO/PF.

2. The method according to claim 1, wherein the X is configured by a network device; or
when the paging-related parameter does not comprise the X, the X is determined according to the paging-related parameter; or
when the paging-related parameter does not comprise the X, the X is determined according to the quantity of beams of the first signal; or
when the paging-related parameter does not comprise the X, the X is determined according to the paging-related parameter and the quantity of beams of the first signal.

3. The method according to claim 2, wherein the X is configured by the network device, comprising:
the X is configured by the network device through a system message.

4. The method according to claim 2, wherein the X is determined according to the N, and the N and the X have a first corresponding relationship; or
the X is determined according to the Ns, and the Ns and the X have a second corresponding relationship; or
the X is determined according to the N and the Ns, and the X, the N and the Ns have a third corresponding relationship; or
the X is determined according to the N, the Ns and the quantity of beams of the first signal, and the X, the N, the Ns and the quantity of beams of the first signal have a fourth corresponding relationship.

5. The method according to claim 1, wherein the value of X is 1, or 2, or 4, or 8.

6. The method according to claim 1, wherein a maximum quantity of PF corresponding to X PO is 2, and a maximum quantity of PF corresponding to one PEI is 2.

7. The method according to claim 1, wherein the second parameter of the PO is associated with at least one of:

a system frame number of the PF where the PO is located, the Ns, the i_s corresponding to the PO, and the X, wherein the i_s represents an index of the PO; and/or the second parameter of the PF is associated with at least one of: the system frame number of the PF, the X.

8. The method according to claim 1, wherein the method further comprises:

when the communication device is a terminal, the terminal receiving the first signal at the sending position of the first signal; or when the communication device is a network device, the network device sending the first signal at the sending position of the first signal.

9. A method for determining a sending position, comprising:

determining, by a communication device, a sending position of a third signal according to a sending position of a second signal;

wherein the second signal is a paging early indication (PEI), and the third signal is a tracking reference signal (TRS), or a channel state information reference signal (CSI-RS);

wherein the sending position of the second signal is determined according to a first parameter, and the first parameter comprises at least one of:

a paging-related parameter;

a quantity of beams of the second signal;

the paging-related parameter comprises at least one of:

N, Ns, T, a target physical downlink control channel (PDCCH) monitoring occasion, X;

wherein the Nis a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO corresponding to one first signal or a quantity of PF corresponding to one first signal;

the sending position of the second signal is determined according to the first parameter in the following manner:

determining a target PO/PF corresponding to the X PO/PF, and determining the sending position of the first signal corresponding to the X PO/PF based on the target PO/PF;

wherein the target PO/PF is determined by a second parameter of each PO/PF in the X PO/PF.

10. A communications device, comprising: a memory, a transceiver, and a processor, wherein the memory is configured to store computer programs; the transceiver is configured to send and receive data under a control of the processor; the processor is configured to read the computer programs in the memory to perform the method for determining a sending position according to claim 9.

11. A communications device, comprising: a memory, a transceiver, and a processor, wherein the memory is configured to store computer programs; the transceiver is configured to send and receive data under a control of the processor; the processor is configured to read the computer programs in the memory to perform:

determining a first parameter;

determining a sending position of a first signal according to the first parameter, wherein the first signal comprises a paging early indication (PEI);

the first parameter comprises at least one of:

a paging-related parameter;

a quantity of beams of the first signal;

the paging-related parameter comprises at least one of:

N, Ns, T, a target physical downlink control channel (PDCCH) monitoring occasion, X;

wherein the Nis a quantity of paging frame (PF) in a discontinuous reception (DRX) cycle, the Ns is a quantity of paging occasion (PO) included in the PF, the T is the DRX cycle, and the target PDCCH monitoring occasion is a first PDCCH monitoring occasion of the PO, the X is a quantity of PO corresponding to one first signal or a quantity of PF corresponding to one first signal;

the determining by the communication device the sending position of the first signal according to the first parameter comprises:

determining, by the communication device, the sending position of the first signal corresponding to the X PO/PF according to the first parameter;

the determining the sending position of the first signal corresponding to the X PO/PF comprises:

determining a target PO/PF corresponding to the X PO/PF, and determining the sending position of the first signal corresponding to the X PO/PF based on the target PO/PF;

wherein the target PO/PF is determined by a second parameter of each PO/PF in the X PO/PF.

12. The communications device according to claim 11, wherein the X is configured by a network device; or when the paging-related parameter does not comprise the X, the X is determined according to the paging-related parameter; or when the paging-related parameter does not comprise the X, the X is determined according to the quantity of beams of the first signal; or when the paging-related parameter does not comprise the X, the X is determined according to the paging-related parameter and the quantity of beams of the first signal.

13. The communications device according to claim 12, wherein the X is configured by the network device, comprising:

the X is configured by the network device through a system message.

14. The communications device according to claim 12, wherein the X is determined according to the N, and the N and the X have a first corresponding relationship; or the X is determined according to the Ns, and the Ns and the X have a second corresponding relationship; or the X is determined according to the N and the Ns, and the X, the N and the Ns have a third corresponding relationship; or the X is determined according to the N, the Ns and the quantity of beams of the first signal, and the X, the N, the Ns and the quantity of beams of the first signal have a fourth corresponding relationship.

15. The communications device according to claim 11, wherein the value of X is 1, or 2, or 4, or 8.

16. The communications device according to claim 11, wherein a maximum quantity of PF corresponding to X PO is 2, and a maximum quantity of PF corresponding to one PEI is 2.

17. The communications device according to claim 11, wherein the second parameter of the PO is associated with at least one of:

a system frame number of the PF where the PO is located, the Ns, the i_s corresponding to the PO, and the X, wherein the i_s represents an index of the PO; and/or the second parameter of the PF is associated with at least one of: the system frame number of the PF, the X.

18. The communications device according to claim 11, wherein the processor is configured to read the computer programs in the memory to perform:

when the communication device is a terminal, the terminal receiving the first signal at the sending position of the first signal; or when the communication device is a network device, the network device sending the first signal at the sending position of the first signal.

\* \* \* \* \*